US012701596B2

(12) United States Patent
Song et al.

(10) Patent No.: US 12,701,596 B2
(45) Date of Patent: Aug. 4, 2026

(54) APPARATUS AND METHOD FOR SLICE CONTROL AND CELL CONTROL IN WIRELESS COMMUNICATION SYSTEM

(71) Applicant: SAMSUNG ELECTRONICS CO., LTD., Suwon-si (KR)

(72) Inventors: Junhyuk Song, Suwon-si (KR); Seungwon Kang, Suwon-si (KR); Youngsung Kho, Suwon-si (KR); Chungkeun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 205 days.

(21) Appl. No.: 18/310,783

(22) Filed: May 2, 2023

(65) Prior Publication Data

US 2023/0337268 A1      Oct. 19, 2023

Related U.S. Application Data

(63) Continuation of application No. PCT/KR2023/001865, filed on Feb. 8, 2023.

(30) Foreign Application Priority Data

| | | |
|---|---|---|
| Feb. 8, 2022 | (KR) | 10-2022-0016555 |
| Feb. 22, 2022 | (KR) | 10-2022-0023198 |
| Feb. 28, 2022 | (KR) | 10-2022-0026277 |

(51) Int. Cl.
  *H04W 72/53*      (2023.01)
  *H04W 16/14*      (2009.01)
  (Continued)

(52) U.S. Cl.
  CPC ......... *H04W 72/53* (2023.01); *H04W 72/044* (2013.01); *H04W 72/54* (2023.01)

(58) Field of Classification Search
  CPC ... H04W 72/53; H04W 72/044; H04W 72/54; H04W 16/14; H04W 24/02
  See application file for complete search history.

(56) References Cited

U.S. PATENT DOCUMENTS

2021/0153066 A1*   5/2021   Guha ................... H04L 47/805
2021/0204164 A1    7/2021   Yavuz et al.
                   (Continued)

FOREIGN PATENT DOCUMENTS

CN        111565418 A    8/2020
EP        3783856 A1     2/2021
                (Continued)

OTHER PUBLICATIONS

Search Report and Written Opinion dated May 17, 2023 issued in International Patent Application No. PCT/KR2023/001865.
(Continued)

*Primary Examiner* — Harry H Kim
(74) *Attorney, Agent, or Firm* — Nixon & Vanderhye P.C.

(57)      ABSTRACT

The disclosure relates to a 5th generation (5G) or pre-5G communication system for supporting a higher data rate after a 4th generation (4G) communication system such as long-term evolution (LTE). According to various embodiments of the disclosure, a method performed by a distributed unit (DU) may include: transmitting, to a near-real time (near-RT) radio access network (RAN) intelligent controller (RIC), an E2 report message including resource policy information related to a shared resource, a prioritized resource, and a dedicated resource of a radio resource for a rRMPolicyMemberList; receiving, from the RT RIC, an E2 control message generated based on the resource policy information; and
  performing a resource allocation based on the E2 control message, wherein the resource policy information includes an rRMPolicyMaxRatio, an rRMPolicyMin-
  (Continued)

Ratio and an rRMPolicyDedicatedRatio, wherein each of the rRMPolicyMaxRatio, the rRMPolicyMinRatio and the rRMPolicyDedicatedRatio are indicated with an integer between 0 and 100.

16 Claims, 26 Drawing Sheets

(51) Int. Cl.
| | | |
|---|---|---|
| *H04W 24/02* | (2009.01) | |
| *H04W 72/044* | (2023.01) | |
| *H04W 72/54* | (2023.01) | |

(56) References Cited

U.S. PATENT DOCUMENTS

| | | | |
|---|---|---|---|
| 2021/0258866 A1* | 8/2021 | Chou ................... | H04W 48/16 |
| 2021/0377116 A1 | 12/2021 | Mao et al. | |
| 2022/0012645 A1* | 1/2022 | Ying ..................... | G06N 20/20 |
| 2022/0046652 A1 | 2/2022 | Yang et al. | |

FOREIGN PATENT DOCUMENTS

| | | |
|---|---|---|
| KR | 10-2021-0117960 | 9/2021 |
| WO | 2021/168753 | 9/2021 |
| WO | WO 2021/187954 A1 | 9/2021 |

OTHER PUBLICATIONS

Dryjanski et al., "Toward Modular and Flexible Open RAN Implementations in 6G Networks: Traffic Steering Use Case and O-RAN xApps", https://www.mdpi.com/journal/sensors, Dec. 7, 2021, 14 pages.
3GPP TSG-SA5, "Discussion on restructure RRMPolicyRatio", Meeting Notes, Meeting #130e, Apr. 20-28, 2020, 3 pages.
O-RAN Working Group 3, "Near-Real-time RAN Intelligent Controller, Near-Real-time RAN Intelligent Controller E2 Service Model (E2SM)", Feb. 2020, 46 pages.
"Open RAN technology and standardization trends", TTA Journal, vol. 197, Sep. 2021, 6 pages.
Extended European Search Report dated Apr. 11, 2025 for EP Application No. 23753157.9.
O-RAN NEAR-Real-Time RIC Dryjanski Marcin; Apr. 13, 2021; 7 pgs.
O-RAN.WG1.Slicing-Architecture-R003-v12.00; Nov. 16, 2012.
Policy related Text for Section 6 and proposed Annex A; Mar. 16, 2021.
Information Model Definitions for NR NRM; 3GPP TS 28.541 V16.9.0 (Jun. 2021).
India Office Action dated Jun. 11, 2026 for IN Application No. 202417059924.
Basilier et a., "Applied network slicing scenarios in 5G" dated Feb. 11, 2021; Magazine | #ericssontechnologyreview.

* cited by examiner

1

APPARATUS AND METHOD FOR SLICE CONTROL AND CELL CONTROL IN WIRELESS COMMUNICATION SYSTEM

CROSS-REFERENCE TO RELATED APPLICATIONS

This application is a continuation of International Application No. PCT/KR2023/001865 designating the United States, filed on Feb. 8, 2023, in the Korean Intellectual Property Receiving Office and claiming priority to Korean Patent Application No. 10-2022-0016555, filed on Feb. 8, 2022, in the Korean Intellectual Property Office, to Korean Patent Application No. 10-2022-0023198, filed on Feb. 22, 2022, and to Korean Patent Application No. 10-2022-0026277, filed on Feb. 28, 2022, in the Korean Intellectual Property Office, the disclosures of all of which are incorporated by reference herein in their entireties.

BACKGROUND

Field

The disclosure relates to an apparatus and method for controlling E2 nodes and cells/slices by RIC in a radio access network. For example, the disclosure relates to an apparatus and method for controlling E2 nodes and cells/slices through an E2 message conforming to an open radio access network (O-RAN) standard of a wireless communication system.

Description of Related Art

Efforts to develop enhanced 5th generation (5G) communication systems or pre-5G communication systems have been ongoing in order to meet the increasing demand for wireless data traffic since 4th generation (4G) communication systems were commercialized. For this reason, the 5G communication systems or pre-5G communication systems are called Beyond 4G network communication systems or post long term evolution (LTE) systems.

The 5G communication system is considered to be implemented in a superhigh frequency band to achieve a high data transmission rate. For the 5G communication systems, technologies for beamforming, massive multiple input multiple output (MIMO), full dimensional MIMO (FD-MIMO), array antenna, analog beam-forming, and large scale antenna are being discussed to mitigate a path loss of a radio wave and to increase a transmission distance of a radio wave in the superhigh frequency band.

In addition, technologies for evolved small cells, advanced small cells, cloud radio access network (RAN), ultra-dense network, device to device communication (D2D), wireless backhaul, moving network, cooperative communication, coordinated multi-points (CoMP), and interference cancellation in the 5G communication systems are developing to enhance networks of systems.

In addition, hybrid frequency shift keying and quadrature amplitude modulation (FQAM) and sliding window superposition coding (SWSC), which are advanced coding modulation (ACM) schemes, and filter bank multi carrier (FBMC), non-orthogonal multiple access (NOMA), and sparse code multiple access (SCMA) which are enhanced accessing technology in the 5G systems are developing.

Due to commercialization of a 5G system or NR (new radio or next radio) to satisfy demands for radio data traffic, a service having a high data transmission rate is provided to a user through the 5G system like 4G, and it is expected that wireless communication services having various purposes such as the Internet of things and services requiring high reliability for a specific purpose will be provided. In the current system in which the 4th generation communication system and the 5th generation system coexist, an O-RAN (open radio access network) established together by operators and equipment providing companies defines a new NE (network element) and the interface standard on the basis of the existing 3GPP standard and suggests an O-RAN architecture

SUMMARY

Embodiments of the disclosure provide an apparatus and method for controlling an E2 node by a radio access network (RIC) intelligent controller (RIC) in a wireless communication system.

Embodiments of the disclosure provide an apparatus and method for RIC control for resources of an E2 node, a cell, and a slice to satisfy a service level agreement (SLA) configured by an operator.

Embodiments of the disclosure provide an apparatus and method for configuring an E2 node to perform resource management of an E2 node, a cell, and a slice through RIC control to satisfy an SLA.

According to various embodiments of the disclosure, a method performed by a distributed unit (DU) may include: transmitting, to a near-real time (near-RT) radio access network (RAN) intelligent controller (RIC), an E2 report message including resource policy information related to a shared resource, a prioritized resource, and a dedicated resource of a radio resource for a rRMPolicyMemberList; receiving, from the RT RIC, an E2 control message generated based on the resource policy information; and performing a resource allocation based on the E2 control message, wherein the resource policy information includes an rRMPolicyMaxRatio, an rRMPolicyMinRatio and an rRMPolicyDedicatedRatio, wherein each of the rRMPolicyMaxRatio, the rRMPolicyMinRatio and the rRMPolicyDedicatedRatio are indicated with an integer between 0 and 100.

According to various embodiments of the disclosure, a method performed by a near-real time (near-RT) radio access network (RAN) intelligent controller (RIC) may include: receiving, from a distributed unit (DU), an E2 report message including resource policy information related to a shared resource, a prioritized resource, and a dedicated resource of a radio resource for a rRMPolicyMemberList; and transmitting, to the DU, an E2 control message generated based on the resource policy information, wherein the resource policy information includes an rRMPolicyMaxRatio, an rRMPolicyMinRatio and an rRMPolicyDedicatedRatio, wherein each of the rRMPolicyMaxRatio, the rRMPolicyMinRatio and the rRMPolicyDedicatedRatio are indicated with an integer between 0 and 100.

According to various embodiments of the disclosure, a device of a distributed unit (DU) may include: at least one transceiver; and at least one processor, wherein the at least one processor is configured to: transmit, to a near-real time (near-RT) radio access network (RAN) intelligent controller (RIC), an E2 report message including resource policy information related to a shared resource, a prioritized resource, and a dedicated resource of a radio resource for a rRMPolicyMemberList; receive, from the RT RIC, an E2 control message generated based on the resource policy information; and perform a resource allocation based on the E2 control message, wherein the resource policy information includes an rRMPolicyMaxRatio, an rRMPolicyMinRatio and an rRMPolicyDedicatedRatio, wherein each of the rRMPolicyMaxRatio, the rRMPolicyMinRatio and the rRMPolicy DedicatedRatio are indicated with an integer between 0 and 100.

According to various embodiments of the disclosure, a device of a near-real time (near-RT) radio access network (RAN) intelligent controller (RIC) may include: at least one transceiver; and at least one processor, wherein the at least one processor is configured to: receive, from a distributed unit (DU), an E2 report message including resource policy information related to a shared resource, a prioritized resource, and a dedicated resource of a radio resource for a rRMPolicyMemberList; and transmit, to the DU, an E2 control message generated based on the resource policy information, wherein the resource policy information includes an rRMPolicyMaxRatio, an rRMPolicyMinRatio and an rRMPolicyDedicatedRatio, wherein each of the rRMPolicyMaxRatio, the rRMPolicyMinRatio and the rRMPolicyDedicatedRatio are indicated with an integer between 0 and 100.

An apparatus and method according to various embodiments of the disclosure enable a radio access network (RAN) intelligent controller (RIC) to control resources of an E2 node, a cell, and a slice.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
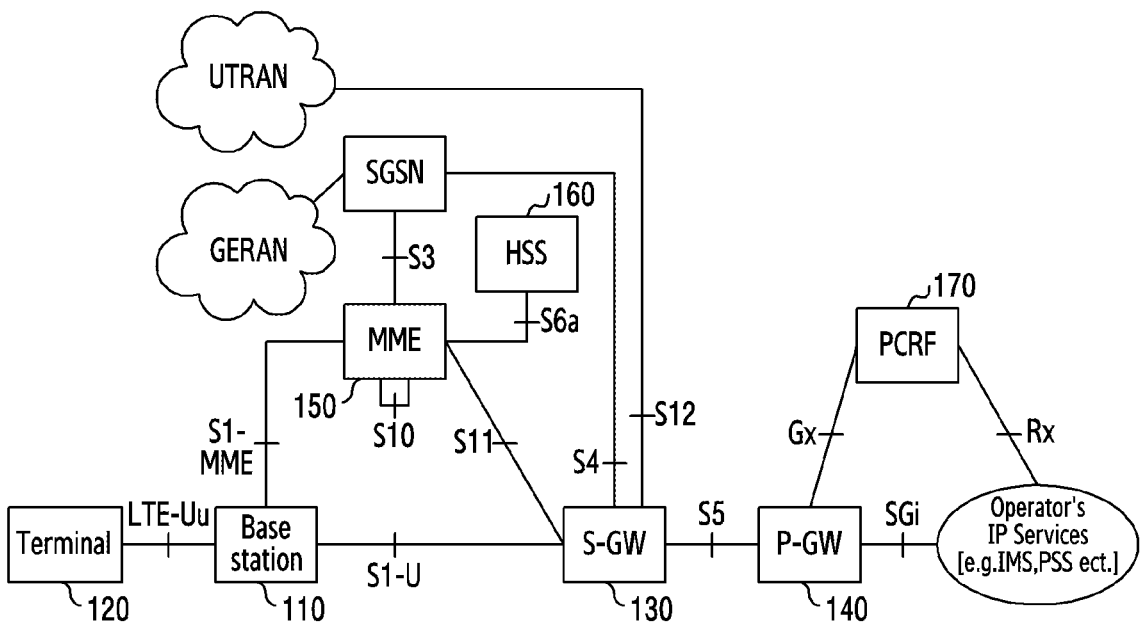
FIG. 1 is a diagram illustrating an example of a 4th generation (4G) long-term evolution (LTE) core system according to various embodiments.

The terms used in the disclosure are used to describe specific embodiments and are not intended to limit the scope of various embodiments. The terms of a singular form may include plural forms unless otherwise specified. All of the terms used herein, which include technical or scientific terms, may have the same meaning that is generally understood by a person skilled in the art. It will be further understood that terms, which are defined in a dictionary, may be interpreted as having the same or similar meanings as or to contextual meanings of the relevant related art and not in an idealized or overly formal way, unless expressly so defined herein in the disclosure. In some cases, even if the terms are terms which are defined in the disclosure, they should not be interpreted as excluding embodiments of the disclosure.

In various embodiments of the disclosure described below, hardware-wise approach methods will be described by way of an example. However, various embodiments of the disclosure include technologies using both hardware and software, and thus do not exclude software-based approach methods.

The disclosure relates to a device and method for performing a subscription procedure between a device in a radio access network (RAN) and a device controlling the RAN in a wireless communication system. For example, the disclosure relates to an apparatus and method for measuring performance for each terminal on an E2 interface in a radio access network, and resource management for each slice of a base station. The disclosure relates to a device and method for delivering a container-based measurement message when a service event occurs for a base station conforming to an open radio access network (O-RAN) standard using an E2 message in a wireless communication system.

In the following description, terms referring to signals, terms referring to channels, terms referring to control information, terms referring to network entities, terms referring to components of a device, etc. are used for convenience of explanation. Accordingly, the disclosure is not limited to the terms described below, and other terms having equivalent technical meanings may be used.

In addition, in the disclosure, an expression of more than or less than may be used to determine whether a specific condition is satisfied or fulfilled, but this is merely a description for expressing an example and does not exclude more or less description. Conditions described as 'greater than or equal to' may be replaced with 'greater than', conditions described as 'less than or equal to' may be replaced with 'less than', and conditions described as 'greater than or equal to and less than' may be replaced with 'greater than and less than or equal to'.

In addition, although the disclosure describes various embodiments using terms used in various communication standards (e.g., 3rd generation partnership project (3GPP), open radio access network (O-RAN)), this is only an example for description. Various embodiments of the disclosure may be easily modified and applied to other communication systems.

In describing embodiments of the disclosure, 'M' of the table represents an information element (IE) that is mandatorily included, and 'O' represents an optionally included IE.

As 4th generation (4G)/5th generation (5G) communication systems (e.g., new radio (NR)) are commercialized, differentiated service support is required for users in virtualized networks. 3GPP is a joint research project between mobile communication-related organizations, and aims to generate specifications for 3G mobile communication systems-globally applicable-within the scope of the IMT-2000 project of the International Telecommunication Union (ITU). 3GPP was established in December 1998, and the 3GPP standard is based on the advanced GSM standard, and includes radio, core network, and service architecture in the standardization range. Accordingly, an open radio access network (O-RAN) newly defined a radio unit (RU), a digital unit (DU), a central unit (CU)-control plane (CP), and a user plane (CU-UP) of a 3GPP network entity (NE) and a base station as an O (O-RAN)-RU, an O-DU, an O-CU-CP, and an O-CU-UP, respectively, and additionally standardized near-real-time (NRT) radio access network intelligent controller (RIC). The disclosure supports an operator specific service model in an E2 interface in which a RIC requests a service from an O-DU, an O-CU-CP or an O-CU-UP. The O-RU, the O-DU, the O-CU-CP, and the O-CU-UP may be understood as objects including a RAN capable of operating according to the O-RAN specification, and may be referred to as E2 nodes. An interface with objects of a RAN that may operate according to O-RAN specifications between RIC and E2 nodes uses E2AP (application protocol).

The RIC is a logical node capable of collecting information on cell sites transmitted and received between the terminal and the O-DU, the O-CU-CP or the O-CU-UP. The RIC may be implemented in the form of servers centrally located in one physical location. Connections may, through, for example, Ethernet, be made between the O-DU and the RIC, between the O-CU-CP and the RIC, and between the O-CU-UP and the RIC. To this end, interface standards for communication between the O-DU and the RIC, between the O-CU-CP and the RIC, and between the O-CU-UP and the RIC are required, and message specifications such as E2-DU, E2-CU-CP, and E2-CU-UP and definition of procedures between the O-DU, the O-CU-CP, the O-CU-UP and the RIC are required. For example, differentiated service support is required for users in virtualized networks, and it is necessary to define the function of messages of E2-DU, E2-CU-CP, and E2-CU-UP to support services for a wide range of cell coverage by centralizing call process messages/functions generated in the O-RAN to the RIC.

The RIC may configure event generation conditions by performing communication using the E2 interface to the O-DU, the O-CU-CP, and the O-CU-UP, and generating and transmitting subscription messages. For example, RIC may configure call process event by E2 generating a subscription request message and delivering the same to the E2 node (e.g., O-CU-CP, O-CU-UP, and O-DU). In addition, after the configuring the event, the E2 node delivers the subscription request response message to the RIC.

The E2 node may transmit the current status to the RIC through an E2 indication/report. The RIC may provide control for O-DU, O-CU-CP, and O-CU-UP using an E2 control message. Various embodiments of the disclosure disclose an E2 indication message that transmits UE-unit measurement information for each period set in the subscription event condition in the O-DU. In addition, various embodiments of the disclosure disclose a message for controlling resources transmitted from RIC to the O-DU.

FIG. 1 is a diagram illustrating an example of a 4th generation (4G) long-term evolution (LTE) core system according to various embodiments.

Referring to FIG. 1, the LTE core system includes a base station 110, a terminal 120, a serving gateway (S-GW) 130, a packet data network gateway (P-GW) 140, a mobility management entity (MME) 150, a home subscriber server (HSS) 160, and a policy and charging rule function (PCRF) 170.

The base station 110 is a network infrastructure that provides radio access to the terminal 120. For example, the base station 110 is a device that performs scheduling by collecting status information such as a buffer status, available transmission power, and channel status of the terminal 110. The base station 110 has coverage defined as a certain geographical area based on a distance over which signals may be transmitted. The base station 110 is connected to the MME 150 through an S1-MME interface. In addition to base station, the base station 110 may be referred to as 'access point (AP)', 'eNodeB (eNB)', 'wireless point', 'transmission/reception point (TRP)' or other terms having equivalent technical meanings.

The terminal 120 is a device used by a user and communicates with the base station 110 through a radio channel. In some cases, the terminal 120 may be operated without user involvement. That is, the terminal 120 and at least one of the terminal 120 is a device that performs machine type communication (MTC) and may not be carried by a user. In addition to terminal, the terminal 120 may be referred to as 'user equipment (UE)', 'mobile station', 'subscriber station', high customer-premises equipment (CPE) 'remote terminal', 'wireless terminal', or 'user device' or other terms having equivalent technical meanings.

The S-GW 130 provides a data bearer and generates or controls the data bearer under the control of the MME 150. For example, the S-GW 130 processes packets arriving from the base station 110 or packets to be forwarded to the base station 110. In addition, the S-GW 130 may perform an anchoring role during handover of the terminal 120 between base stations. The P-GW 140 may function as a connection point with an external network (e.g., Internet network). In addition, the P-GW 140 allocates an Internet protocol (IP) address to the terminal 120 and serves as an anchor for the S-GW 130. In addition, the P-GW 140 may apply a quality of service (QOS) policy of the terminal 120 and manage account data.

The MME 150 manages mobility of the terminal 120. In addition, the MME 150 may perform authentication for the terminal 120 and bearer management. That is, the MME 150 is in charge of mobility management and various control functions for the terminal. The MME 150 may interwork with a serving GPRS support node (SGSN).

The HSS 160 stores key information and a subscriber profile for authentication of the terminal 120. The key information and the subscriber profile are delivered from the HSS 160 to the MME 150 when the terminal 120 accesses a network.

The PCRF 170 defines rules for policy and charging. The stored information is delivered from the PCRF 180 to the P-GW 140, and the P-GW may perform control (e.g., QoS management, charging, etc.) for the terminal 120 based on information provided from the PCRF 180.

Carrier aggregation (hereinafter 'CA') may refer, for example, to a technology for increasing frequency use efficiency from the perspective of a terminal or a base station by combining a plurality of component carriers and by transmitting and receiving signals by one terminal simultaneously using such a plurality of component carriers. Specifically, according to the CA technology, a terminal and a base station may transmit and receive signals using a wideband using a plurality of component carriers in uplink (UL) and downlink (DL), respectively, and in this case, each component carrier is located in a different frequency band. Hereinafter, uplink refers to a communication link through which a terminal transmits a signal to a base station, and downlink refers to a communication link through which a base station transmits a signal to a terminal. In this case, the number of uplink component carriers and downlink component carriers may be different from each other.

Dual connectivity or multi-connectivity may refer, for example, to a technology for increasing frequency use efficiency from the perspective of a terminal or a base station by transmitting and receiving signals by simultaneously using carriers in a plurality of base stations located in different frequency bands by connecting one terminal to a plurality of different base stations. The terminal may be simultaneously connected to a first base station (e.g., a base station providing services using LTE technology or 4th generation mobile communication technology) and a second base station (e.g., a base station providing services using new radio (NR) technology or 5th generation (5G) mobile communication technology) to transmit and receive traffic. In this case, frequency resources used by each base station may be located in different bands. As described above, a method operating based on the dual connectivity method of LTE and NR may be referred to as 5G non-standalone (NSA).

Figure 2A:
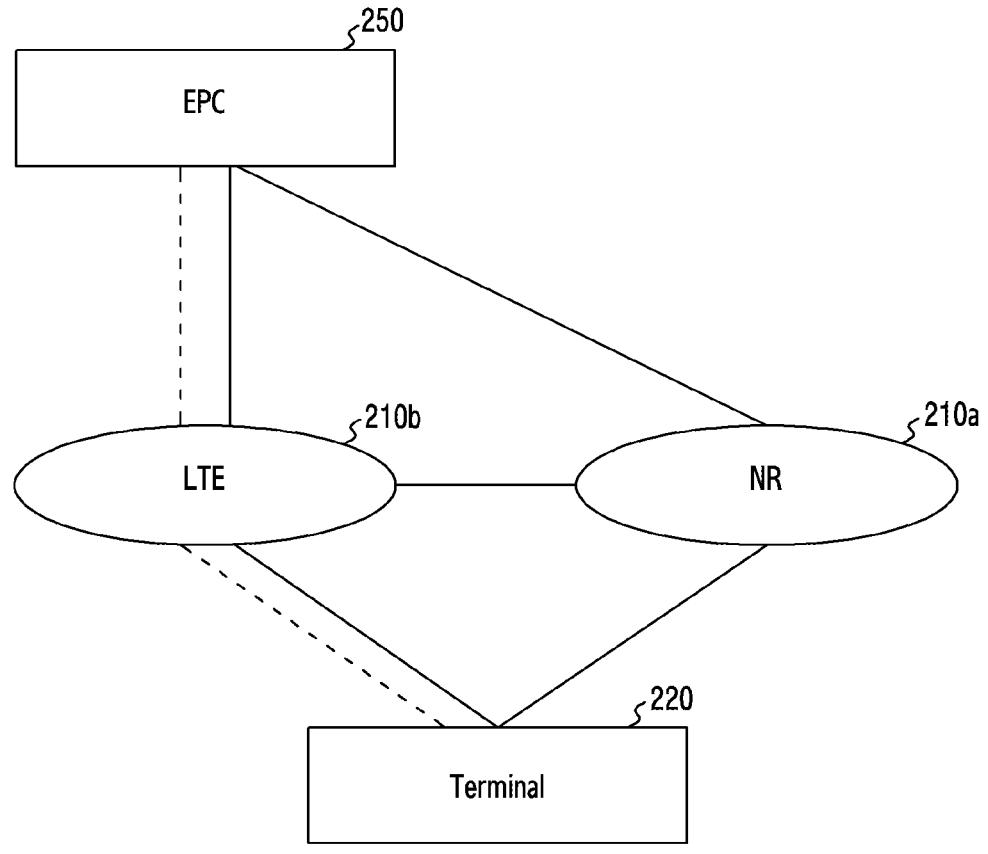
FIG. 2A is a diagram illustrating an example of a 5th generation (5G) non-standard alone (NSA) system according to various embodiments.

FIG. 2A is a diagram illustrating an example of a 5G NSA system according to various embodiments.

Referring to FIG. 2A, the 5G NSA system includes an NR RAN 210a, an LTE RAN 210b, a terminal 220, and an EPC 250. The NR RAN 210a and the LTE RAN 210b are connected to the EPC 250, and the terminal 220 may simultaneously receive services from either or both of the NR RAN 210a and the LTE RAN 210b. The NR RAN 210a includes at least one NR base station, and the LTE RAN 210b includes at least one LTE base station. Here, the NR base station may be referred to as '5th generation node (5G node)', 'next generation nodeB (gNB)', or other terms having the same or similar technical meaning. In addition, the NR base station may have a structure separated into a central unit (CU) and a digital unit (DU), and the CU may have a structure divided into a CU-CP (control plane) unit and a CU-UP (user plane) unit.

In the structure illustrated in FIG. 2, the terminal 220 may perform radio resource control (RRC) access through a first base station (e.g., a base station belonging to the LTE RAN 210b) and receive a service of a function (e.g., connectivity management, mobility management, etc.) provided by a control plane. In addition, the terminal 220 may be provided with additional radio resources for transmitting and receiving data through a second base station (e.g., a base station belonging to the NR RAN 210a). This dual connectivity technology using LTE and NR may be referred to as evolved universal terrestrial radio access (E-UTRA)-NR dual connectivity (EN-DC). Similarly, a dual connectivity technology in which the first base station uses an NR technology and the second base station uses an LTE technology is referred to as NR-E-UTRA dual connectivity (NE-DC). In addition, various embodiments may be applied to various other forms of multi-connectivity and carrier aggregation technologies. In addition, various embodiments may be applied to a case where a first system using a first communication technology and a second system using a second communication technology are implemented in one device, or when the first base station and the second base station are located in the same geographical location.

Figure 2B:
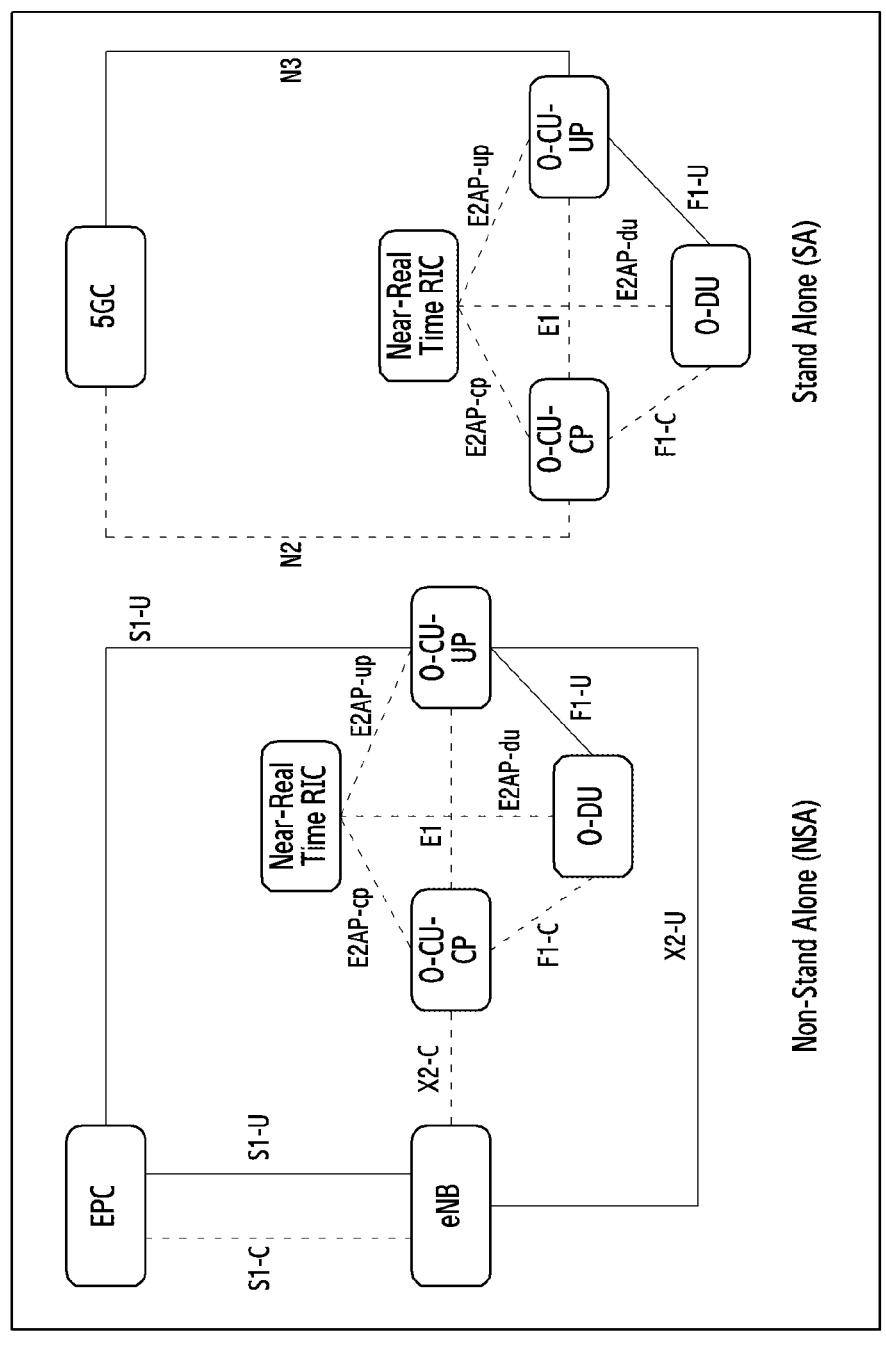
FIG. 2B is a diagram illustrating an example of an architecture for O-RAN according to various embodiments.

FIG. 2B is a diagram illustrating an example architecture for O-RAN according to various embodiments. For the purpose of key performance indicator (KPI) monitoring (E2-SM-KPIMON) of the E2 service model, while O-RAN non-stand-alone mode in multi-connectivity operation using E-UTRA and NR radio access technology is considered, the E2 node may be assumed to be in O-RAN stand-alone mode.

Referring to FIG. 2B, in a deployment of the O-RAN non-standalone mode, the eNB is connected to the EPC through the S1-C/S1-U interface, and connected to O-CU-CP through the X2 interface. O-CU-CP for a deployment in the O-RAN standalone mode may be connected to 5G core (5GC) through N2/N3 interface.

The O-RAN provides RAN with openness, agility, and scalability. For RAN evolution, the O-RAN enables support for open and interoperable interfaces, RAN virtualization, big data and AI-enabled RAN intelligence. It also maximizes and/or increases the use of commercial hardware and commercial silicon and avoids the use of dedicated hardware. Embedded or back-end artificial intelligence (AI)/ machine learning (ML) systems provide network intelligence through near real-time (NRT) and non-real-time (NRT) analytics. The O-RAN enables configuration of virtualized intelligent networks with standardized open interfaces.

The interface between the near-RT RIC and the E2 node may be referred to as the E2 interface. In the E2 interface, a radio network layer may use the E2AP protocol. The E2AP procedure includes an E2AP near-RT RIC functional procedure and an E2AP global procedure. The E2AP near-RT RIC functional procedure may be used to deliver application specific messages between xApp (near-RT RIC applications) and the target function of the E2 node. The E2AP global procedure may be used for E2 interface management and service update.

Figure 3:
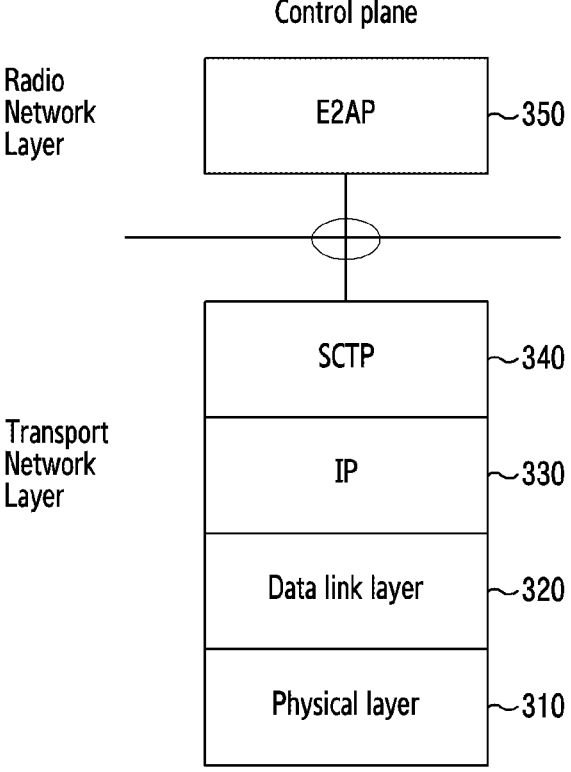
FIG. 3 is a diagram illustrating an example protocol stack of an E2 application protocol message in a radio access network according to various embodiments.

FIG. 3 is a diagram illustrating an example protocol stack of an E2 application protocol message in a radio access network according to various embodiments. Referring to FIG. 3, a control plane includes a transport network layer and a radio network layer. The transport network layer includes a physical layer 310, a data link layer 320, an Internet protocol (IP) 330, and a stream control transmission protocol (SCTP) 340.

The radio network layer includes an E2AP (350). The E2AP 350 is used to deliver a subscription message, an indication message, a control message, a service update message, and a service query message, and is transmitted in a higher layer of the SCTP 340 and the IP 330.

Figure 4:
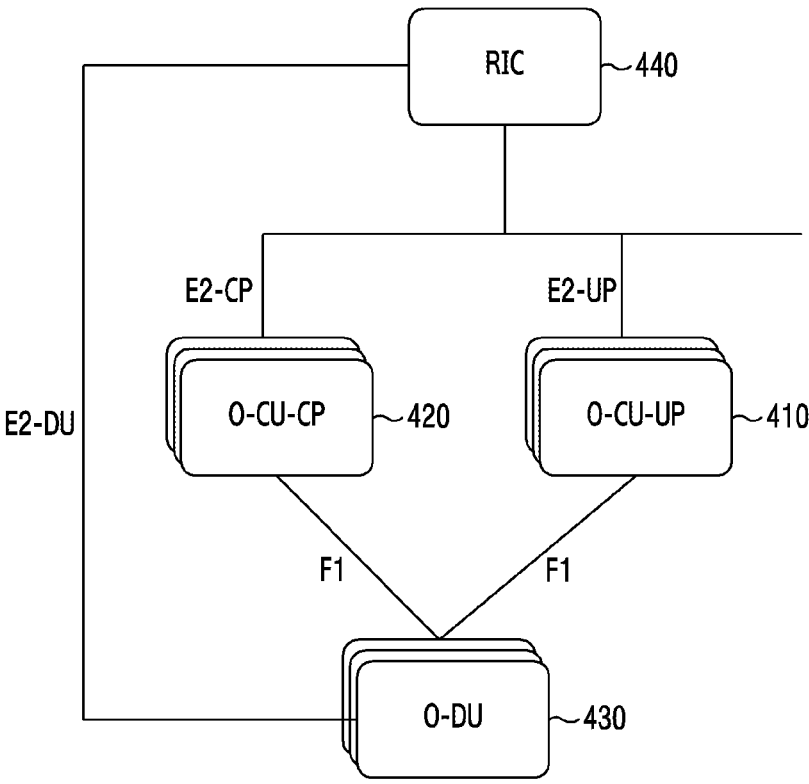
FIG. 4 is a diagram illustrating an example of connection between a base station and a radio access network intelligence controller (RIC) in a radio access network according to various embodiments.

FIG. 4 is a diagram illustrating an example of connection between a base station and a radio access network intelligence controller (RIC) in a radio access network according to various embodiments.

Referring to FIG. 4, an RIC 440 is connected to an O-CU-CP 420, an O-CU-UP 410, and an O-DU 430. The RIC 440 may be a device for customizing RAN functionality for new services or regional resource optimization. The RIC 440 may provide functions such as network intelligence (e.g., policy enforcement and handover optimization), resource assurance (e.g., radio-link management and advanced self-organized-network (SON)), and resource control (e.g., load balancing and slicing policy). The RIC 440 may communicate with the O-CU-CP 420, the O-CU-UP 410, and the O-DU 430. The RIC 440 may be connected to each node through E2-CP, E2-UP, and E2-DU interfaces. In addition, an interface between the O-CU-CP and the DU and an interface between the O-CU-UP and the DU may be referred to as an F1 interface. In the following description, the DU and the O-DU, the CU-CP and the O-CU-CP, and the CU-UP and the O-CU-UP may be used interchangeably.

Although FIG. 4 illustrates one RIC 440, a plurality of RICs may exist according to various embodiments. A plurality of RICs may be implemented with a plurality of hardware located in the same physical location or through virtualization using one hardware.

Figure 5:
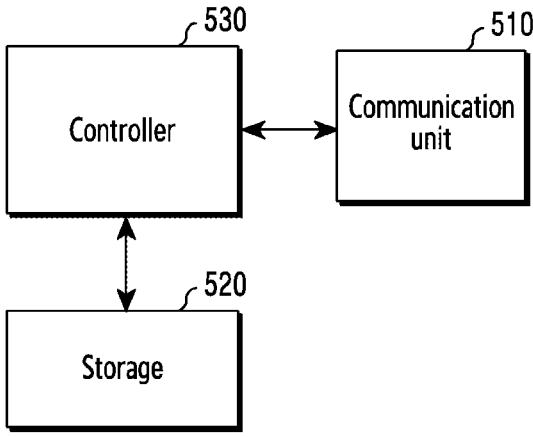
FIG. 5 is a block diagram illustrating an example configuration of a device in a radio access network according to various embodiments.

FIG. 5 is a block diagram illustrating an example configuration of a device in a radio access network according to various embodiments. The structure illustrated in FIG. 5 may be understood as a configuration of a device having at least one function of RIC, O-CU-CP, O-CU-UP, and O-DU of FIG. 4. Terms such as ' . . . unit', etc. used below refer to a unit that processes at least one function or operation, which may be implemented by hardware or software, or a combination of hardware and software.

Referring to FIG. 5, the core network device includes a communication unit (e.g., including communication circuitry) 510, a storage unit (e.g., including a memory) 520, and a controller (e.g., including various control or processing circuitry) 530.

The communication unit 510 may include various communication circuitry and provides an interface for communicating with other devices in a network. That is, the communication unit 510 converts a bit string transmitted from the core network device to another device into a physical signal, and converts a physical signal received from the other device into a bit string. That is, the communication unit 510 may transmit and receive signals. Accordingly, the communication unit 510 may be referred to as a modem, a transmitter, a receiver, a transceiver, or the like. In this case, the communication unit 510 enables the core network device to communicate with other devices or systems through a backhaul connection (e.g., wired backhaul or wireless backhaul) or a network.

The storage unit 520 may include a memory and stores data such as basic programs, application programs, and configuration information for the operation of the core network device. The storage unit 520 may include a volatile memory, a non-volatile memory, or a combination of volatile and non-volatile memories. In addition, the storage unit 520 provides the stored data according to the request of the controller 530.

The controller 530 may include various control or processing circuitry and controls overall operations of the core network device. For example, the controller 530 transmits and receives signals through the communication unit 510. In addition, the control unit 530 writes and reads data in and from the storage unit 520. To this end, the controller 530 may include at least one processor. According to various embodiments, the controller 530 may control the device to perform operations according to various embodiments described in the disclosure.

Figure 6:
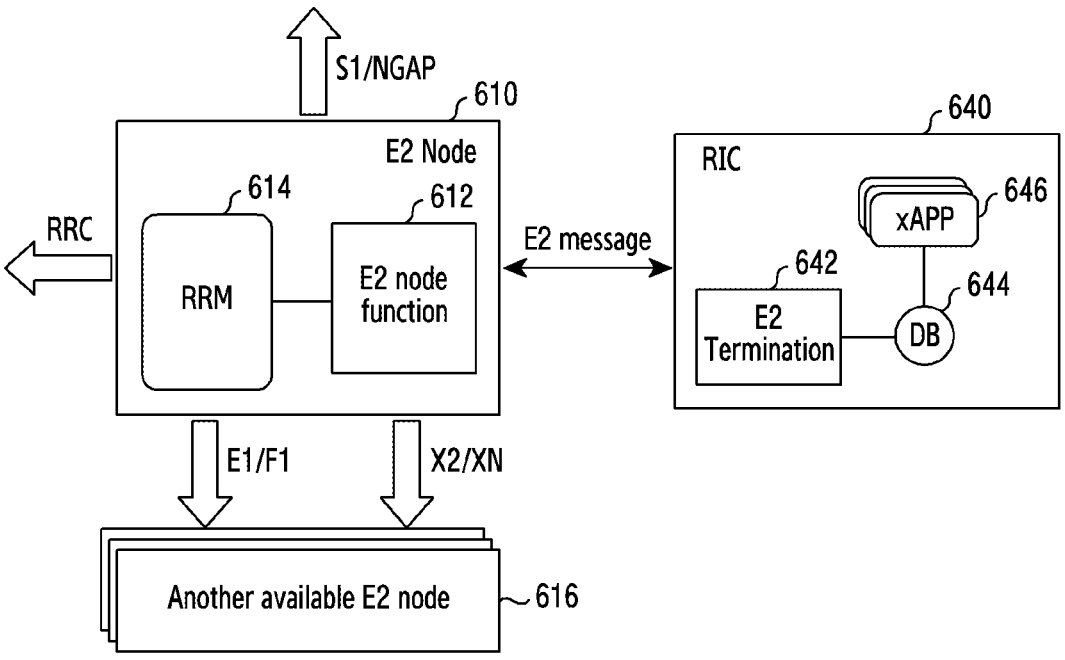
FIG. 6 is a diagram illustrating example logical functions related to an E2 message of an E2 node and an RIC in a radio access network according to various embodiments.

FIG. 6 is a diagram illustrating logical functions related to an E2 message of an E2 node and an RIC in a radio access network according to various embodiments.

Referring to FIG. 6, the RIC 640 and the E2 node 610 may transmit or receive an E2 message to or from each other. For example, the E2 node 610 may be an O-CU-CP, an O-CU-UP, an O-DU, or a base station. A communication interface of the E2 node may be determined according to the type of the E2 node 610. For example, the E2 node 610 may communicate with another E2 node 616 through an E1 interface or an F1 interface. The E2 node 610 may communicate with the E2 node 616 through an X2 interface or an XN interface. Alternatively, for example, the E2 node 610 may perform communication through an S1 interface or a next generation application protocol (NGAP) interface (e.g., an interface between a next generation (NG) RAN node and an AMF).

The E2 node 610 may include E2 node function 612. The E2 node function 612 is a function corresponding to a specific xApp (application S/W) 646 installed in the RIC 640. For example, in the case of a KPI monitor, a KPI monitor collection S/W is installed in the RIC 640, and the E2 node 610 may include the E2 node function 612 that, after generating the KPI parameters, delivers an E2 message including the KPI parameters to an E2 termination 642 located in the RIC 640. The E2 node 610 may include radio resource management (RRM) 614. The E2 node 610 may manage resources provided to a radio network for the terminal.

The E2 termination 642 located in the RIC 640 may be the termination of the RIC 640 for the E2 message, and performs a function of interpreting the E2 message delivered by the E2 node 610 and delivering the same to the xApp 646. A database (DB) 644 located in the RIC 640 may be used for the E2 termination 624 or xApp 616. The E2 node 610 illustrated in FIG. 6 may be the termination of at least one interface, and may be understood as terminations of messages delivered to a terminal, a neighboring base station, and a core network.

Figure 7:
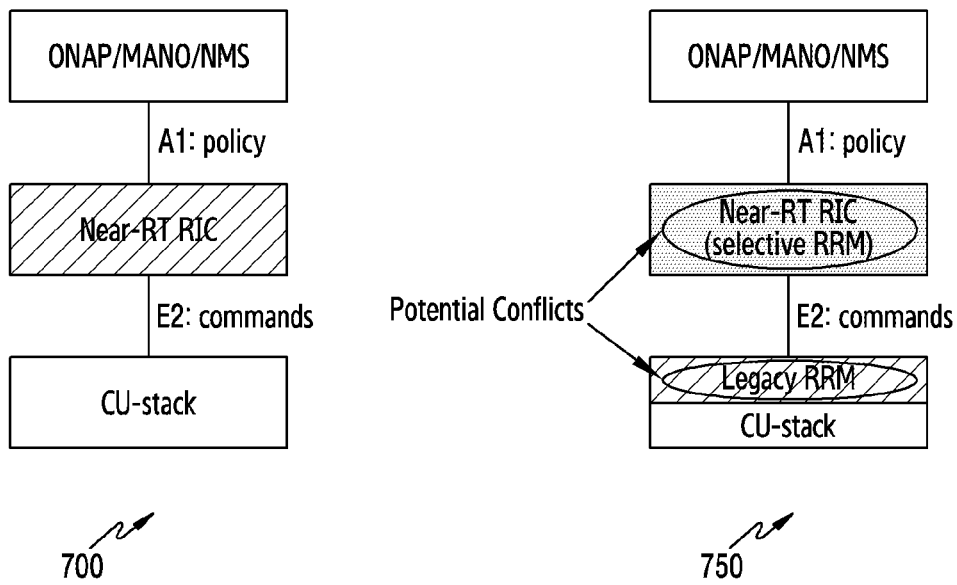
FIG. 7 is a diagram illustrating examples of functional separation between an E2 node and an RIC according to various embodiments.

FIG. 7 is a diagram illustrating examples of functional separation between an E2 node an d an RIC according to various embodiments. O-RAN specification provides functional separation between the E2 node and the RIC. For example, the E2 node may be a CU. The RIC may be a near-RT RIC. The RIC may be connected to an open network automation platform (ONAP)/management and orchestration (MANO)/network management system (NMS) through an A1 interface. The RIC may be connected to the E2 node through an E2 interface. The E2 interface may deliver commands. Functional separation options may include functional separation 700 in which the entire radio resource management (RRM) is managed by the near-RT RIC, and functional separation 750 in which RRM is selectively managed by the near-RT RIC.

According to the WG3 decision of the Jan. 16, 2019 meeting, the near-RT RIC will support E2 as an open logical interface targeting a multi-supplier environment, independent of the specific RRC-RRM algorithm implementation located in the nRT-RIC. In the disclosure, E2 service model radio interface control (E2SM-RIC) paired with E2SM-NI capable of injection/modification/configuration of per UE RRC messages for each I/F and network entity (NE) may be disclosed. In other words, the near-RT RIC may be improved from functional separation 750 to progressively functional separation 700. The E2 is independent of the specific RRC-RRM algorithm implementation present in the nRT-RIC and may evolve into an open logical interface targeting a multi-supplier environment.

Figure 8:
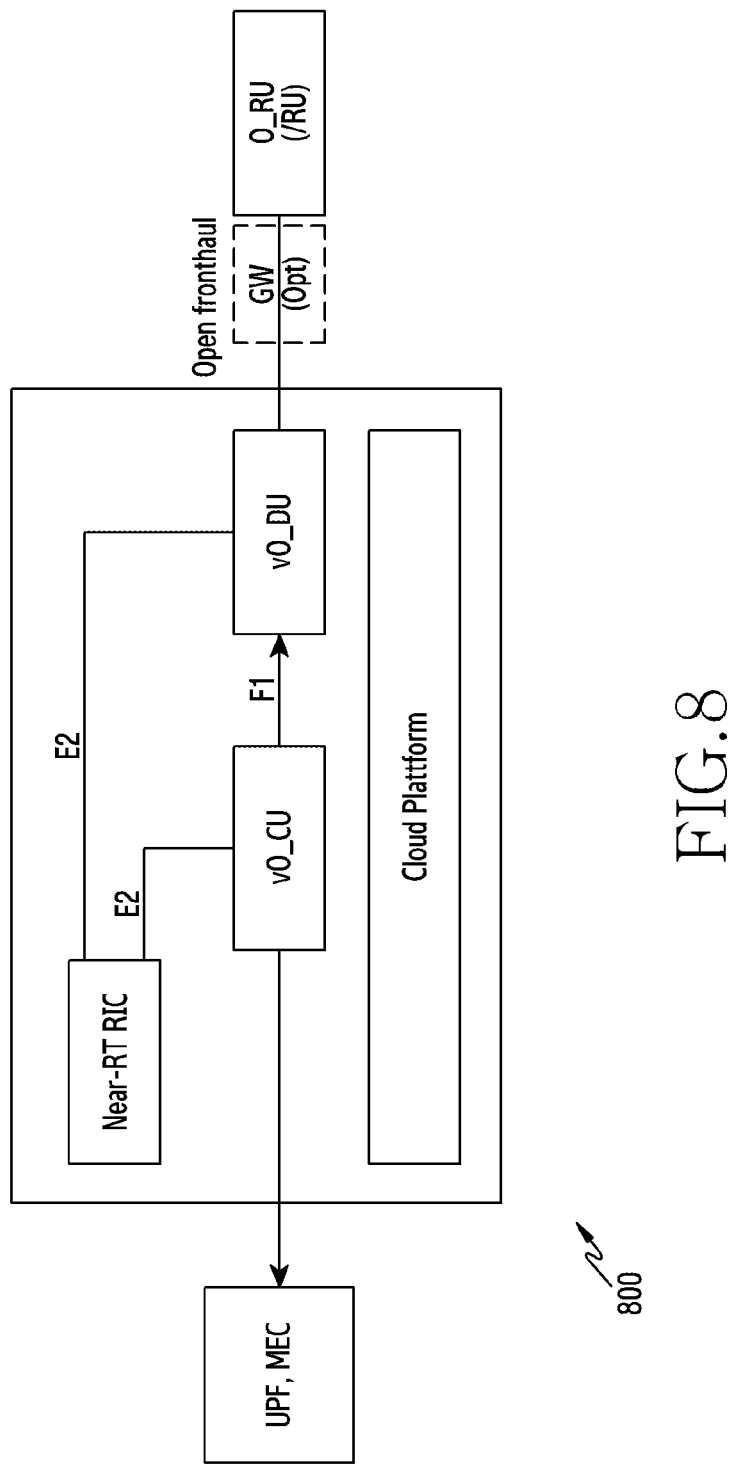
FIG. 8 is a diagram illustrating an implementation example of an E2 node and an RIC according to various embodiments.

FIG. 8 is a diagram illustrating an implementation example of an E2 node and an RIC according to various embodiments. In a scenario of implementation 800, the E2 nodes (e.g., O-DU and O-CU) and the RIC may be virtualized on cloud platforms (e.g., open chassis and blade-specific edge clouds) and configured in devices (e.g., servers). This scenario can support deployment in dense urban areas with abundant fronthaul capacity allowing BBU functions to be pooled to a central location, with low enough latency to meet O-DU latency requirements. Accordingly, it may not be necessary to attempt to centralize the RIC close to RT beyond the limit being able to centralize the O-DU function. According to an embodiment, the E2SM-RIC may be optimized for O-RAN deployment scenarios in which the near-RT RIC, the O-CU, and the O-DU are implemented in the O-Cloud Platform.

Figure 9:
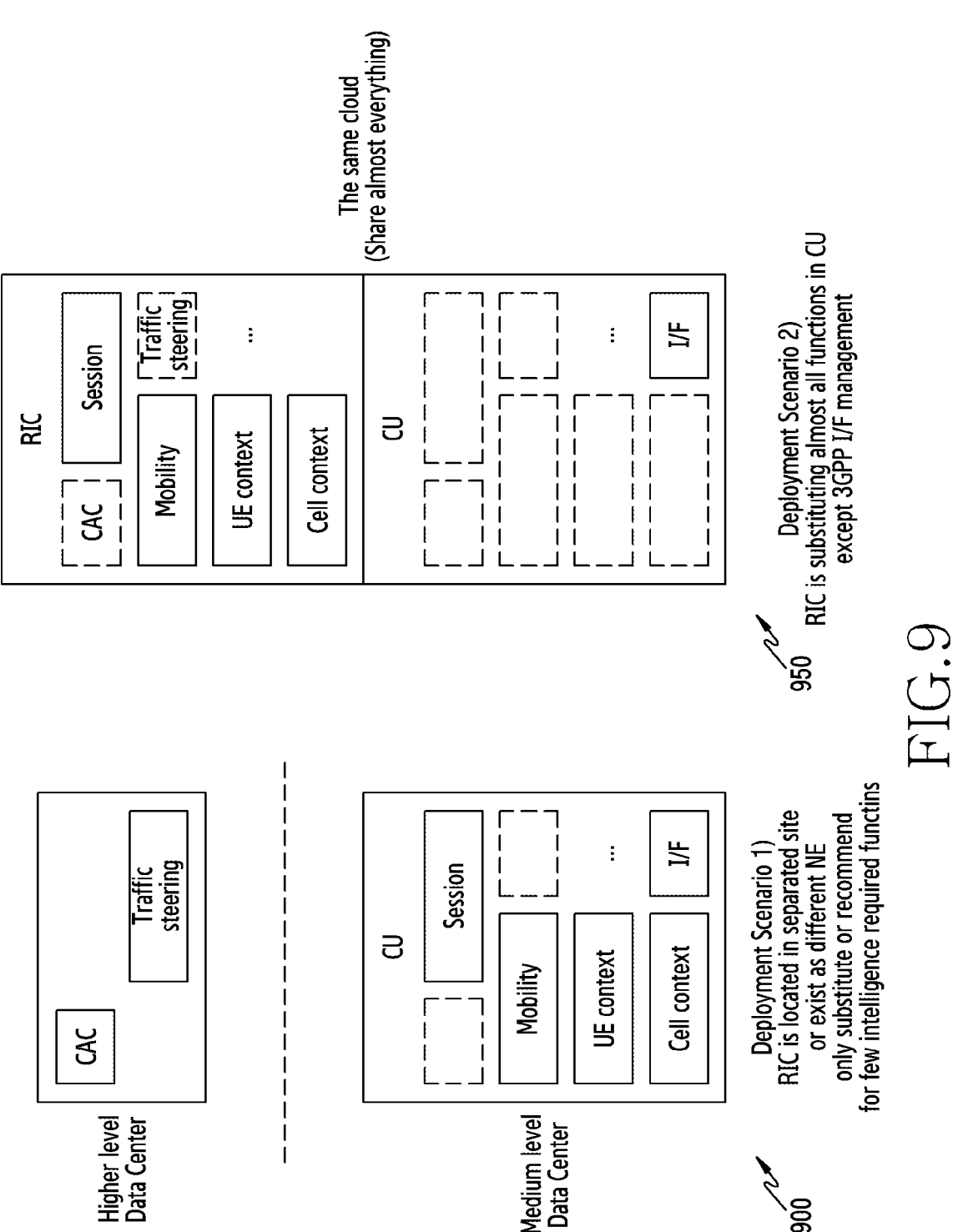
FIG. 9 is a diagram illustrating examples of functional separation between a centralized unit (CU) and an RIC according to various embodiments.

FIG. 9 is a diagram illustrating examples of functional separation between a centralized unit (CU) and an RIC according to various embodiments. Referring to FIG. 9, functional separations may be performed according to deployment scenario #1 900 or functional deployment scenario #2 950.

Deployment scenario #1 900: The RIC is located in a separate site or only exists as another NE, replacing or recommending some intelligence essential functions.

Deployment scenario #2 950: The RIC may replace almost all functions of the CU except for 3GPP I/F management.

Although FIG. 9 illustrates two scenarios, other scenarios may be applied. For example, in the deployment scenario #1 900, the mobility function may be performed by the RIC rather than the CU. In addition, as an example, in deployment scenario #1 900, the UE context function may be performed by the RIC rather than the CU. In addition, as an example, in the deployment scenario #1 900, the session configuration function may be performed by the RIC rather than the CU.

Figure 10:
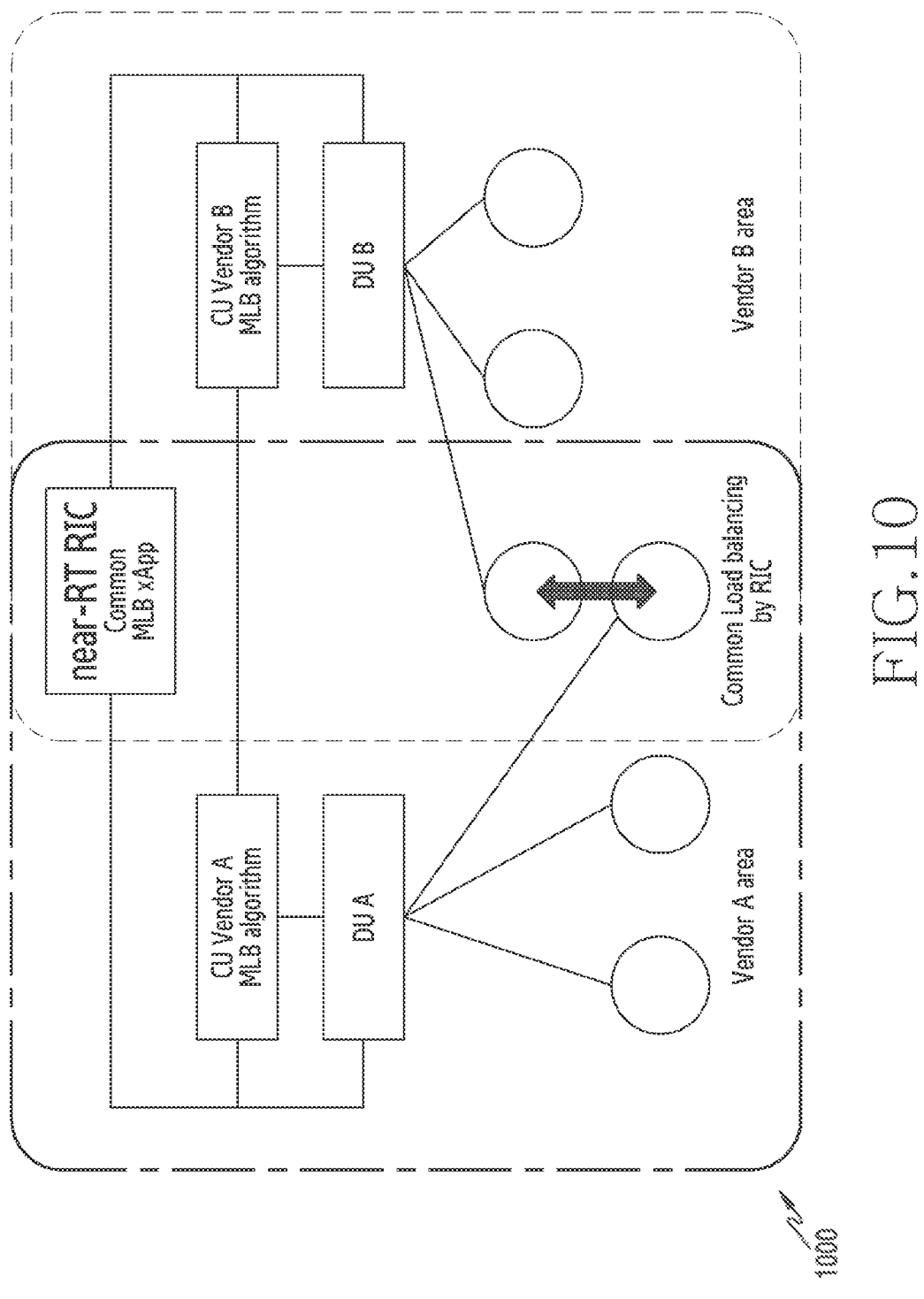
FIG. 10 is a diagram illustrating an example of mobility load balancing (MLB) control for different vendors according to various embodiments.

FIG. 10 is a diagram illustrating an example of mobility load balancing (MLB) control for different vendors according to various embodiments. This MLB may be performed by RRM control. A first CU and a first DU may be provided by vendor A. A second CU and a second DU may be provided by vendor B. The first DU may provide service area of the vendor A. RUs connected to the first DU may provide service area of the vendor A. The second DU may provide service area of the vendor B. RUs connected to the second DU may provide service area of the vendor B.

When a terminal moves, which cell is optimal may be performed through load balancing. If this load balancing is performed by different vendors, it may be difficult to smoothly perform load balancing in a space where service areas of the vendors overlap. That is, it is required to perform interworking between vendors in an inter-vendor zone or an inter-CU-CP area. For interworking between these vendors, the RRM control may be required to be performed in a centralized form. Accordingly, the RIC according to various embodiments of the disclosure may be configured to perform RRM. The RIC may generate messages to control each E2 node as well as simply receive measurements from each E2 node. The RIC may transmit a control message to each E2 node (e.g., DU, CU-CP, or CU-UP).

Figure 11A:
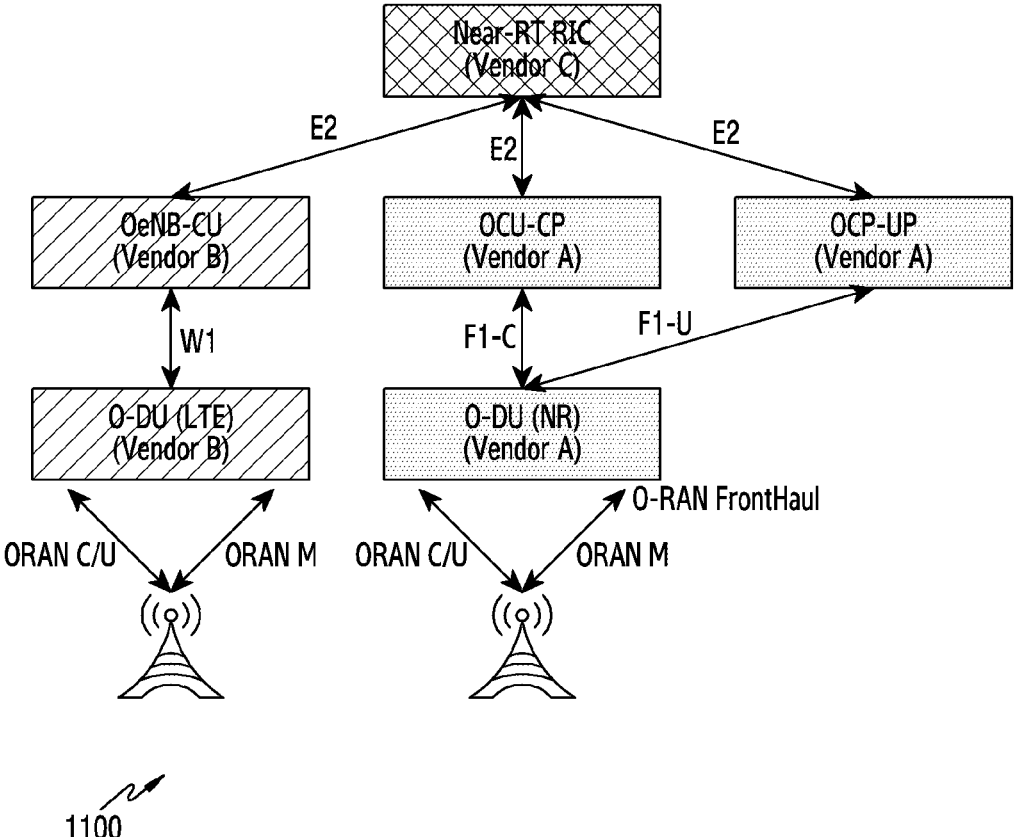
FIG. 11A is a diagram illustrating an example of MLB control for different vendors according to various embodiments.

FIG. 11A is a diagram illustrating an example of MLB control for different vendors according to various embodiments. If operating as a single vendor, a RAN context may be identified in a near-RT RIC. In addition, trigger events/REPORT, INSERT, and POLICY conditions may work. Control actions may also work, and generic sub-function definition approaches may also work. However, as illustrated in FIG. 11A, if operating as multi-vendors, the RAN context may not be identified in the near-RT RIC. In addition, trigger events/REPORT, INSERT, and POLICY conditions doesn't work. Control actions may not work or are implementation dependent due to the collision of local RRM.

A single E2SM-RAN control is difficult to operate properly in a multi-vendor O-RAN situation. This is because when all RAN features are considered, there is function parity and operation parity. RAN functional parity refers to differences in features related to RRM functions (e.g., quality of service (QOS) handover, load balancing (LB) handover, etc.). RAN operational parity refers to differences in features related to RAN operations (e.g., EN-DC SCG bearer change procedure). In addition, operations for REPORT/INSERT/CONTROL/POLICY may not identify the correct RAN context. In addition, REPORT/INSERT/CONTROL/POLICY operations may not identify trigger events/conditions according to REPORT/INSERT/POLICY. In addition, in a corresponding operation, it may be difficult to refer to the RAN context in a specific deployment.

Referring to FIG. 11A, a wireless communication environment 1100 illustrates network entities configured through a total of three vendors. Vendor A may be a NR supplier. Vendor B may be an LTE supplier. Vendor C may be a RIC supplier. In order to address the above-described problems, one entity that may manage all of the E2 nodes of any vendor is required. Because the near-RT RIC may collect all measurement information even from different vendors, the near-RT RIC may perform management and control more easily than other entities. Accordingly, differences and compatibility problems between vendors may be resolved by performing RRM in a centralized manner by the near-RT RIC. In addition, even in different RATs, differences and compatibility problems between vendors may be resolved.

Hereinafter, in the disclosure, centralized RRM by near-RT RIC may be referred to and described in terms such as RIC-based RRM control, E2 node zombie mode, E2SM-RIC zombie mode, E2SM-RIC dedicated mode, etc. Of course, the technical meaning of performing the function of each E2 node by the RIC may be used instead of the terms illustrated above.

Figure 11B:
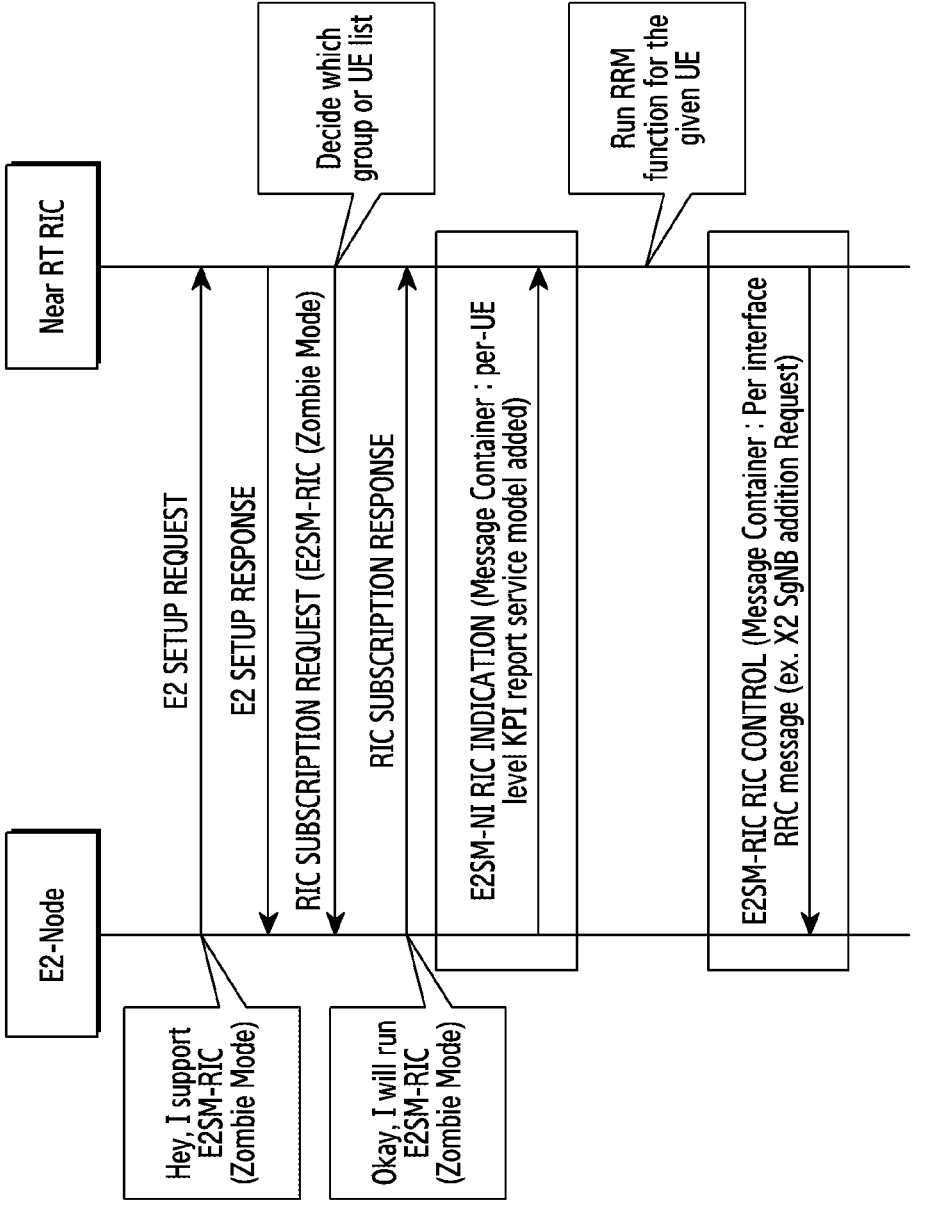
FIG. 11B is a signal flow diagram illustrating example signaling for radio resource management (RRM) control configuration of a near-RT RIC according to various embodiments.

FIG. 11B is a signal flow diagram illustrating example signaling for RRM control configuration of a near-RT RIC according to various embodiments. FIG. 11B illustrates an example of a signaling procedure between the E2 node and the RIC. For example, FIG. 11B illustrates a setup procedure of the E2 I/F and an RIC subscription message delivery procedure between the E2 node and the RIC. In addition, in FIG. 11B, a delivery procedure of the RIC indication message and the RIC control message is illustrated.

Referring to FIG. 11B, the E2 node may transmit an E2 setup request message to the RIC. An E2 node function located in the E2 node may search for the RIC using the IP address of the RIC configured by operation-administration-maintenance (OAM) and transmit the E2 setup request message. In this case, the E2 node may request RIC-based RRM control. For example, the E2 node may transmit the E2 setup request message including the fact that the E2 node is capable of zombie mode operation to the RIC. In a subsequent step, the RIC may receive an E2 setup response message from the E2 node. The RIC may determine, from the E2 node, whether the E2 node supports the zombie mode, that is, full RRM control by the RIC is possible.

Referring to FIG. 11B, the RIC may transmit a subscription request (RIC SUBSCRIPTION REQUEST) message to the E2 node. A specific xApp located in the RIC requests subscription for a specific RAN function definition function supported by the E2 to the RIC E2 termination function. According to an embodiment, the subscription request message may include information for indicating whether the RIC performs RIC-based RRM control. For example, the subscription request message may include information for indicating whether the RIC operates as an E2SM-RIC. In addition, for example, the RIC may transmit a subscription request message including a zombie mode indicator. According to an embodiment, RIC-based RRM control may be performed in units of a terminal or a terminal group including the terminal. As illustrated in FIGS. 10 and 11A, the RIC-based RRM control may be performed for a terminal located in an area between vendors or a common service area of CU-UPs or a group including the terminal. In this case, the subscription request message may include an ID indicating a group (hereinafter, a group identifier) or an ID for indicating a specific terminal (hereinafter, a terminal ID/UE Id).

According to an embodiment, as illustrated in FIG. 7, the subscription request message and the E2 setup response message may be separately transmitted. According to an embodiment, the subscription request message of the step may be included in the E2 setup response message of the step and transmitted together.

In a subsequent step, the E2 node may transmit a subscription request response (RIC SUBSCRIPTION RESPONSE) to the RIC. The E2 node function of the E2 node may decode the subscription request message. The E2 node may identify whether the RIC is an E2SM RIC. The E2 node may identify whether the RIC operates in zombie mode or whether the E2 node operates in zombie mode.

Referring to FIG. 11B, the E2 node may transmit an E2 RIC indication message to the RIC. The E2 node and the RIC may perform an RIC indication procedure. According to embodiments of the disclosure, the RIC indication message may include a KPI reporting per UE. According to an embodiment, the message container of the RIC indication message may include a KPI reporting service model per UE.

Thereafter, the RIC may perform RRM for the corresponding UE. Although not illustrated in FIG. 11B, the RIC may perform RRM and generate a control message including specific information related to a resource allocation procedure. Through this, the RIC can perform control of each E2 node.

An E2SM RIC control message may be transmitted to the E2 node 610. The E2 node 610 and the RIC 640 may perform RIC control procedures. The RIC 640 may generate an E2SM-RIC RIC control message for the control procedure of the E2 node. For example, the E2SM-RIC RIC control message may include a message container. The message container may include an RRC message (e.g., X2 SgNB addition request message) for each interface.

In FIG. 11B, although described in units of UE, measurements may be performed and reported in units of various units such as a group/network slice of a UE, and RIC control may be performed.

In FIG. 11B, the setup procedure, the RIC subscription procedure, the RIC indication message transmission procedure, and the RIC control message transmission procedure are sequentially described, but various embodiments of the disclosure are not limited to the above-described order and procedure. In various embodiments, the E2 node and the RIC may independently perform the E2 configuration procedure. In various embodiments, the E2 node and the RIC may independently perform the subscription procedure. On the other hand, according to an embodiment, as described above, the E2 setup response message may include a subscription request message. In various embodiments, the E2 node and RIC may independently perform the RIC indication procedure. In addition, in various embodiments, the E2 node and the RIC may independently perform the RIC control procedure. In addition, the E2 node and the RIC may perform at least some of the above-described procedures together or separately.

The current E2SM-RC specification is designed for RAN control per UE. However, in performing RAN control, it needs to be performed in units of cells/or E2 nodes, so various embodiments of the disclosure disclose a method for control in units of cells/E2 nodes. Control methods in units of network slices in a corresponding cell as well as in units of cells may also be understood as example embodiments of the disclosure. According to an embodiment, control in units of cells/slides/E2 nodes may be performed for energy saving. According to an embodiment, control for service level agreement (SLA) assurance/RAN slicing and energy saving in units of cells/slides/E2 nodes may be performed. According to an embodiment, control in units of cells/slides/E2 nodes may be performed for idle mode mobility. According to an embodiment, control in units of cells/slides/E2 nodes may be performed for cell barring. Hereinafter, control of a service model of a cell-based E2 node will be described with reference to FIGS. 12A to 12C.

Figure 12A:
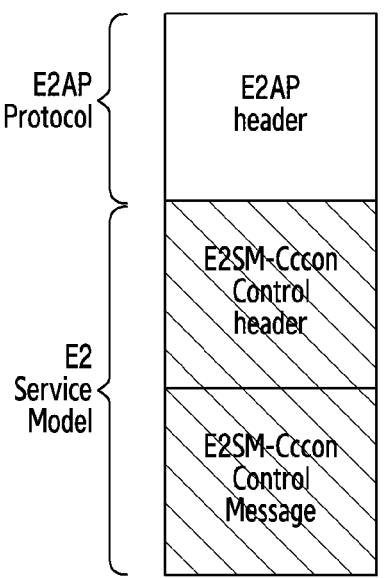
FIG. 12A is a diagram illustrating an example of a cell control message according to various embodiments.

FIG. 12A is a diagram illustrating an example of a cell control message according to various embodiments. In FIG. 12A, examples of E2SM-CC control header and E2SM-CC control message used in E2SM-cell control (CC) and supported by O-RAN E2 service model are described. On the other hand, the format of this control message is merely for describing the operation of the E2SM-CC according to various embodiments of the disclosure, and does not mean that specific signaling is an essential component and must be performed before other signaling.

The table below illustrates the E2SM-CC control header format 1 loaded on the E2SM-CC control header.

TABLE 1

| IE/Group Name | Presence | Range | IE type and reference | Semantics description |
|---|---|---|---|---|
| CHOICE Control Header Format | M | | | |
| >E2SM-CC Control Header Format 1 | | | x.x.x.x | |

The E2SM-CC control header format 1 of the above table carries and delivers the information of the following table.

TABLE 2

| IE/Group Name | Presence | Range | IE type and reference | Semantics description |
|---|---|---|---|---|
| Global E2 Node ID | M | | | |
| Cell Global ID | M | | | |
| Slice ID | M | | | |
| Control Action ID | O | | | |

The Global E2 Node ID is an information element defined in the O-RAN standard and may be used to designate a specific O-DU. The Cell Global ID is a cell ID including PLMN ID, and may be used to uniquely designate a cell of an operator's network. The Slice ID is the S-NSSAI value. The Control Action ID is an optional value and is used to distinguish other call admission control (CAC) operations from CAC operations of a specific slice in a specific cell.

The table below illustrates E2SM-CC control message format 1.

TABLE 3

| IE/Group Name | Presence | Range | IE type and reference | Semantics description |
|---|---|---|---|---|
| CHOICE Control Message Format | M | | | |
| >E2SM-CC Control Message Format 1 | | | x.x.x.x | |

The E2SM-CC control message format 1 delivers the following IE. Slice CAC weight is a parameter that controls the portion of the DRB of slice CAC, and the slice CAC timer is the time at which the weight of slice CAC is applied in the O-DU. If no additional control message is received from the RIC during the timer period, the time returns to the initial setting value of the O-DUCAC.

TABLE 4

| IE/Group Name | Presence | Range | IE type and reference | Semantics description |
|---|---|---|---|---|
| Slice CAC Weight | M | [0 . . . 1] | | CAC weight value increase by 0.1 indicates the CAC Weight timer. |
| Slice CAC Timer | M | | INTEGERIndicates the CAC Weight timer. The values are expressed in seconds. (1 . . . 7200, . . . ) | The values are expressed in seconds. |

Figure 12B:
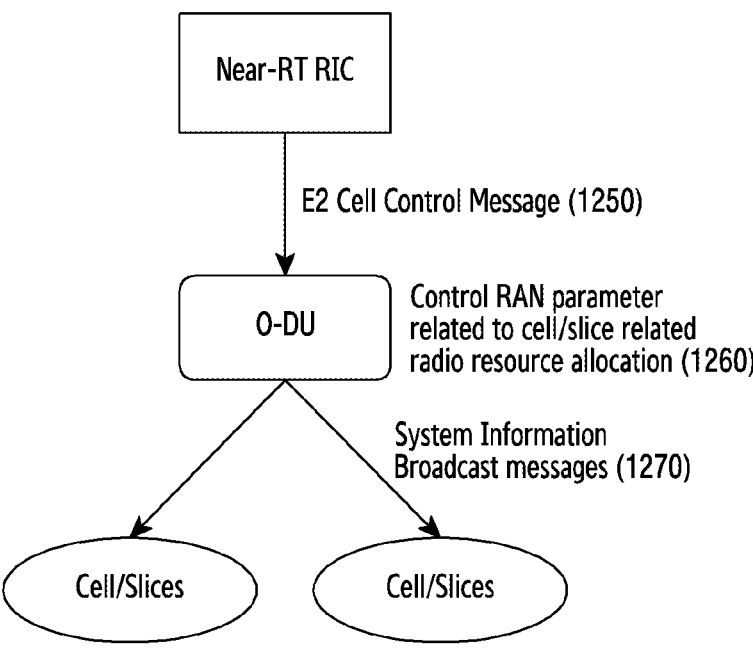
FIG. 12B is a diagram illustrating an example of an E2 service model for cell control according to various embodiments.

FIG. 12B is a diagram illustrating an example of an E2 service model for cell control according to various embodiments. A cell configuration message to an E2 node (e.g., O-DU) may be referred to as an E2 control message.

In operation 1250, the near-RT RIC may transmit a control message to the O-DU through the E2 interface. The control message may include cell configuration information.

The control message may include an E2 node ID. The control message may include a DU ID. The control message may include cell identification information (e.g., global cell ID). The control message may include slice information (e.g., S-NSSAI) in a corresponding cell. The control message may include, for example, an E2 control request message. Although not illustrated in FIG. 12B, in various embodiments, the near-RT RIC may receive an E2 control ack message from the DU.

In operation 1260, the DU may control RAN parameters based on the control message from the near-RT RIC. The RAN parameters may refer, for example, to parameters for a cell/slice related to radio resource allocation. Although not illustrated in FIG. 12B, in various embodiments, the DU may report to the near-RT RIC. This report may include the number of slice CAC failures and the number of currently operating DRBs. In operation 1270, the DU may transmit the control message on the access network. Here, the control message may refer to a message for radio resource control of a cell. For example, the control message may refer to a broadcast message of radio resource control (RRC) system information (e.g., SIB) or an RCC message (e.g., RRC reconfiguration). The control message may be configured to include RAN parameters according to operation 1260.

Figure 12C:
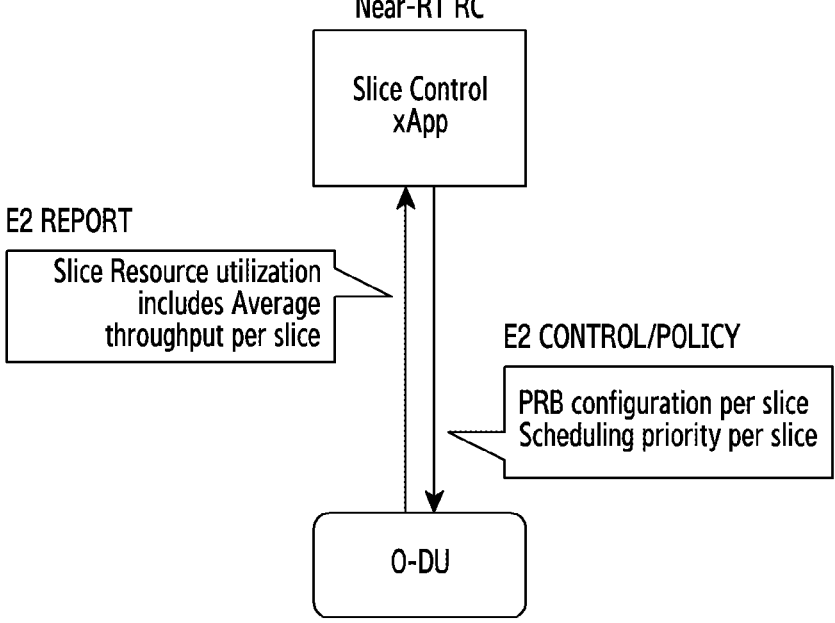
FIG. 12C is a diagram illustrating an example of cell control-based resource configuration according to various embodiments.

FIG. 12C is a diagram illustrating an example of cell control-based resource configuration according to embodiments of the disclosure. To perform resource control at a level that may satisfy service level agreement (SLA) of slice, slice call admission control (CAC) may be used. SLA assurance may allow a closed loop control mechanism to guarantee slice SLAs and prevent/reduce possible violations. Embodiments of the disclosure may provide SLA guarantee in S-NSSAI per cell level.

Referring to FIG. 12C, the DU may transmit an E2 report to the near-RT RIC. The E2 report may include information on resource utilization for each slice. For example, the E2 report may include throughput per slice. For example, throughput may be provided in the form of an average. The DU may receive E2 control/policy from the near-RT RIC. The E2 control message or policy configuration message may include information on priorities for each network slice. The E2 control message or policy configuration message may include UL/DL PRB configuration (e.g., allocation size and allocation location) for each network slice.

According to an embodiment, embodiments of the disclosure may dynamically optimize UL/DL PRB configuration and scheduling priority based on traffic of each slice of a cell. For example, when the traffic demand for a slice is high, the near-RT RIC may increase the UL/DL PRB portion for the slice. In addition, for example, when the traffic demand for a slice is low, the near-RT RIC may reduce the UL/DL PRB portion for the slice.

Figure 13A:
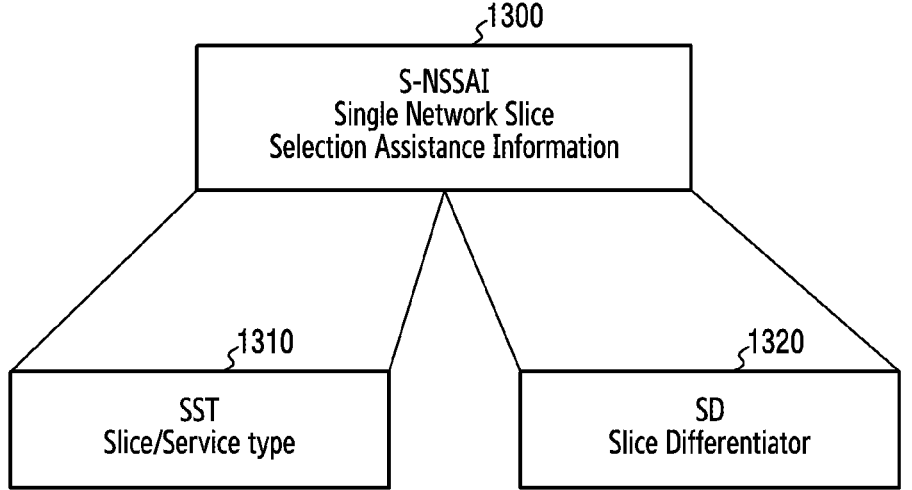
FIG. 13A is a diagram illustrating an example of a slice identifier according to various embodiments.

FIG. 13A is a diagram illustrating an example of a slice identifier according to various embodiments. According to an embodiment, in FIG. 13A, the format of single network slice selection assistance information (S-NSSAI) defined in 3GPP may be used for the slice identifier that is the subject of call admission control in the disclosure.

Referring to FIG. 13A, the S-NSSAI 1300 may be configured as follows.

Slice/service type (SST) 1310

Slice differentiator (SD) 1320, which is optional information that complements the slice/service type to distinguish between several network slices.

Here, the slice/service type (SST) 1310 is mandatory information and may be 8 bits, and the service differentiator (SD) 1320 is optional information and may be 24 bits.

Figure 13B:
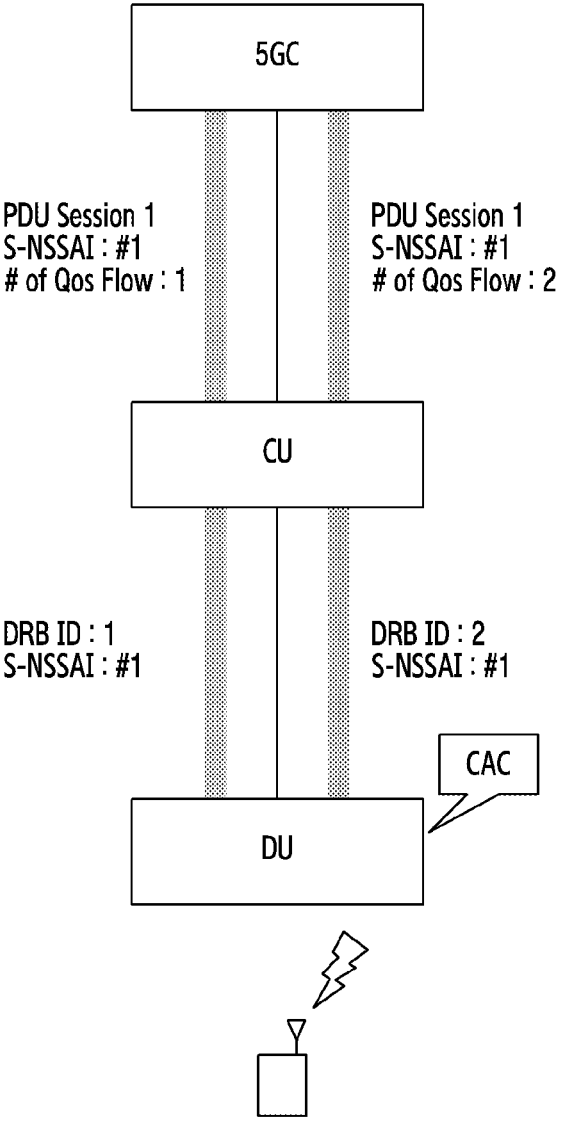
FIG. 13B is a diagram illustrating an example of a relationship between a protocol data unit (PDU) session, a data radio bearer (DRB), and a quality of service (QoS) flow in a core network and an E2 node according to various embodiments.

FIG. 13B is a diagram illustrating an example of a relationship between a protocol data unit (PDU) session, a data radio bearer (DRB), and a quality of service (QoS) flow in a core network and an E2 node according to various embodiments. In FIG. 13B, when a UE registers with 5GC and requests O-DU and a plurality of DRBs to be set up in a specific cell according to embodiments of the disclosure, the CAC function of O-DUs performing call admission control for each S-NSSAI is illustrated.

Referring to FIG. 13B, the S-NSSAI may be mapped with one or more PDU sessions. The S-NSSAI refers to a network slice, where the network slicing refers to logically dividing and using a network. There is one S-NSSAI per PDU session, and the same S-NSSAI may be associated with a plurality of PDU sessions. The PDU session may be associated with one or more QoS flows, and the PDU session may be associated with one or more DRBs. The DRB may be mapped with one or more QoS flows, and there may be one S-NSSAI value per DRB.

Each DRB may include S-NSSAI for each DRB ID.

TABLE 5

| DRB to Be Setup List | | |
|---|---|---|
| >DRB to Be Setup Item IEs | | 1 . . . <maxnoofDRBs> |
| >>DRB ID | M | |
| >>CHOICE QoS Information | M | |
| >>>E-UTRAN QoS | M | |
| >>>DRB Information | | 1 |
| >>>>DRB QoS | M | |
| >>>>S-NSSAI | M | |

A group may be formed among DRBs having the same S-NSSAI. The DRBs in this group may be the same PDU session. Up to 8 S-NSSAIs per UE are possible, and the number of DRBs and DRB ID lists corresponding to each S-NSSAI may be defined. Slice index and DRB group (e.g., PDU session) may be mapped through PLMN and S-NS-SAI.

When a UE requests call setup from 5GC, an AMF may allocate S-NSSAI per specific PDU session. For example, the S-NSSAI may be mapped with a plurality of DRB/QOS flows. The first PDU session associated with the S-NSSAI may include one QoS flow, and the second PDU session associated with the S-NSSAI may include two QoS flows. The O-DU may perform call admission control (CAC) for the number of DRBs per S-NSSAI received in the F1 UE context setup request message as much as the DRB capacity that the O-DU may support.

Resources may be allocated more efficiently due to the introduction of network slicing. In order to perform resource control at a level that may satisfy the service level agreement (SLA) of the slice, available resources for each slice may be differentiated, and it may be required to use resources within allocated resources for each slice, and an acceptable PRB usage for each slice may be configured. Quality of service (QOS) control may be performed within available resources for each slice.

In order to operate the above-described slice resource control more accurately and effectively, embodiments of the disclosure provide a slice radio resource allocation and QoS control method based on the near-RT RIC of the O-RAN. Hereinafter, examples of control messages of RIC (e.g., RIC for E2SM-CC or Cell/E2 Node control) according to various embodiments of the disclosure are described in greater detail below with reference to FIG. 14.

Figure 14:
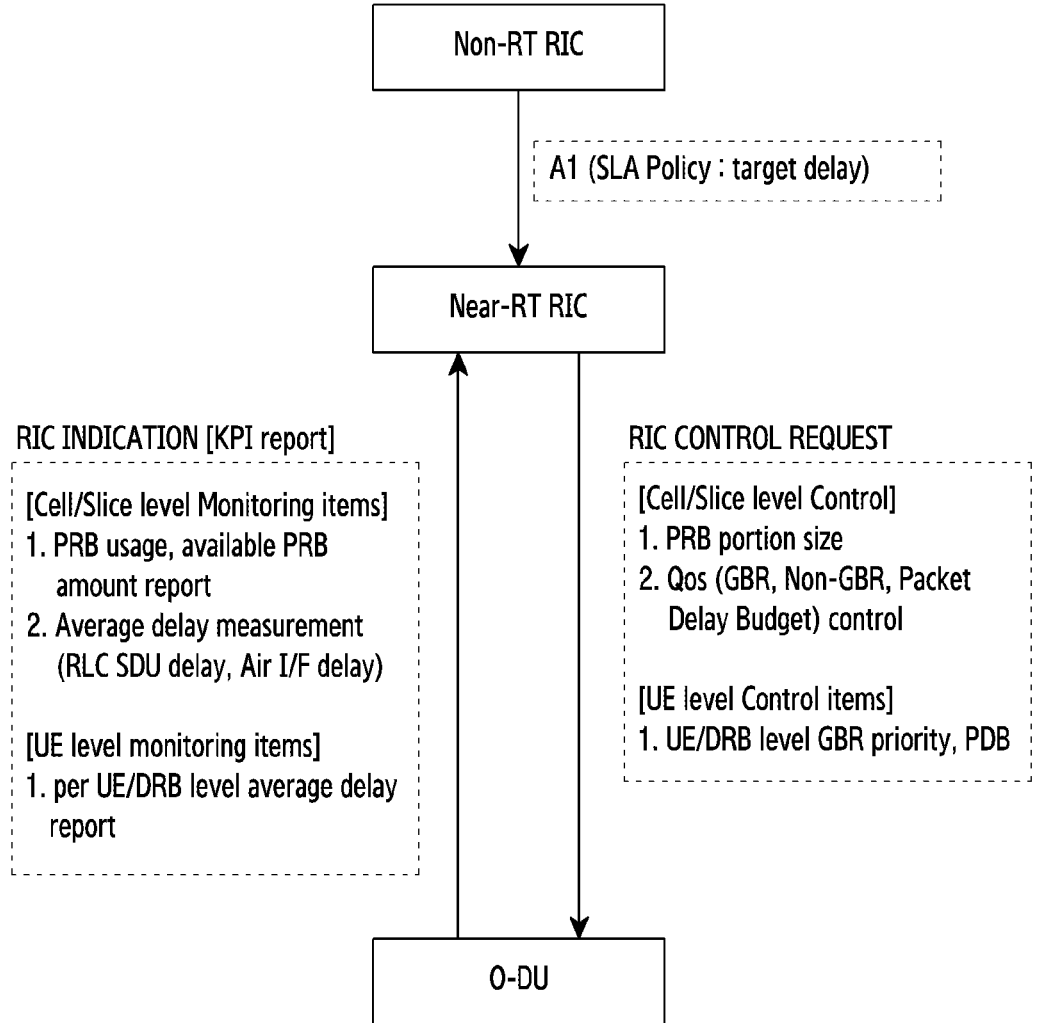
FIG. 14 is a diagram illustrating an example of slice control according to various embodiments.

FIG. 14 is a diagram illustrating an example of slice control according to various embodiments. In FIG. 14, examples of overall operations for slice resource control provided by a non-RT RIC, a near-RT RIC, and an O-DU are described.

Although not illustrated in FIG. 14, the non-RT RIC may be associated with SMO. The SMO is responsible for RAN domain management and orchestration functions. Main function of SMO to provide RAN support in O-RAN include fault, configuration, alarms, performance, and security (FCAPS) interface to O-RAN NF, non-real time (RT) RAN intelligent controller (RIC) framework for RAN optimization, O-Cloud management, orchestration, and workflow management. The non-RT RIC is an SMO internal function of the O-RAN architecture that provides an A1 interface to the near-real time RAN intelligent controller (near-RT RIC). The main goal of non-RT RIC is to support intelligent RAN optimization by providing policy-based guidance, ML model management, and enrichment information to the near-RT RIC so that the RAN may optimize RRM under specific conditions. The non-RT RIC may perform RAN optimization at non-real-time (e.g., 1 second or longer) intervals using data analytics, artificial intelligence (AI)/machine learning (ML) training, and inference. An interface between the SMO and the E2 node or an interface between the SMO and the near-RT RIC may be defined as an O1 interface. According to an embodiment, the initial values of the near-RT RIC and the O-DU or the operations, administration and maintenance (OAM) configuration information may be configured using the O1 configuration message of the O1 management interface defined in the O-RAN standard.

The non-RT RIC may transmit SLA policy to the near-RT RIC using A1 interface. The SLA policy may include quality-related target values. That is, the non-RT RIC may deliver target values for each cell or slice to the near-RT RIC using the A1 interface. According to an embodiment, the target delivery value may be determined as a QoS value for each PLMN or a value of a quantified radio resource. According to an embodiment, the target delivery value may be determined as a QoS value for each cell or a quantified radio resource value. According to an embodiment, the target delivery value may be determined as a QoS value for each slice or a value of a quantified radio resource. According to an embodiment, the target delivery value may be determined as a QoS value for each PLMN, each cell, and each slice, or a value of a quantified radio resource.

The near-RT RIC may receive a RIC indication message from the O-DU. The RIC indication may include key performance indicator (KPI) information for reporting. According to an embodiment, the KPI information may include information on a target to be monitored at a cell level (or slice level). For example, the monitoring target may include PRB usage and possible PRB size. In addition, for example, the monitoring target may include an average delay measurement (e.g., RLC SDU delay and air interface delay). In addition, for example, the monitoring target may include a delay violation rate. According to an embodiment, the KPI information may include information on a UE level monitoring target. For example, KPI information may include UE level average delay or DRB level average delay. That is, the near-RT RIC may receive PRB usage, delay measurement, and delay violation information for each PLMN, each cell, and each slice from the O-DU in order to meet the target value of A1. In addition, the near-RT RIC may collect UE level and DRB level delay information as additional information.

The near-RT RIC may transmit a RIC control request to the O-DU. The near-RT RIC may perform cell level control or slice level control for O-DU. The near-RT RIC may perform the size of the PRB portion and QoS (guaranteed bit rate (GBR), non-GBR, and packet delay budget) control. According to an embodiment, the near-RT RIC may perform cell/slice level PRB/slice portion control with the RIC control request message based on information for each PLMN, each cell, and each slice received from the O-DU. According to an embodiment, the near-RT RIC enables UE level control by adjusting UE/DRB level GBR priority and packet delay budget based on information for each UE and each DRB received from the O-DU.

Figure 15:
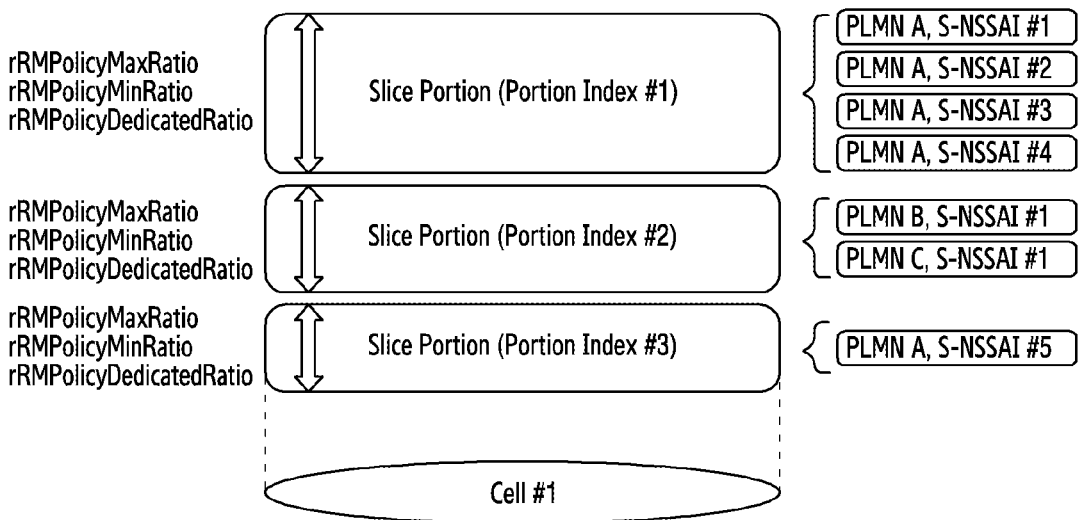
FIG. 15 is a diagram illustrating an example of a slice portion according to various embodiments.

FIG. 15 is a diagram illustrating an example of a slice portion according to various embodiments. Several slices of the disclosure may share resources.

Referring to FIG. 15, a slice portion may refer to a slice set sharing allocated resources. The slice set may include one or more slices. Slices in the slice set may share radio resources. Hereinafter, although embodiments of the disclosure are described by referring to the slice set as a target of resource sharing as a slice portion, terms having the same technical meaning as the slice portion (e.g., slice allocation portion, slice set, and slice sharing group) may be substituted and used. Methods and parameters for resource sharing are described in detail with reference to FIG. 16 to be described in greater detail below.

The slice portion may be mapped with at least one of PLMN or S-NSSAI. Each slice portion is divided by a slice portion ID. For example, a first slice portion (portion index #1) may include 4 slices. The same resource may be shared between 4 slices. The second slice portion (portion index #2) may include two slices. The same resource may be shared between two slices. The third slice portion (portion index #3) may include one slice. It is possible to share the radio (radio resource) of a cell (e.g., cell #1) with a slice portion divided by slice portion ID between multiple slices mapped to PLMN and S-NSSAI.

In FIG. 15, a slice portion, a PLMN, and an S-NSSAI are illustrated by way of non-limiting example based on one cell, but embodiments of the disclosure are not limited thereto. Of course, resource sharing based on a slice portion may be performed even between multiple cells.

Figure 16:
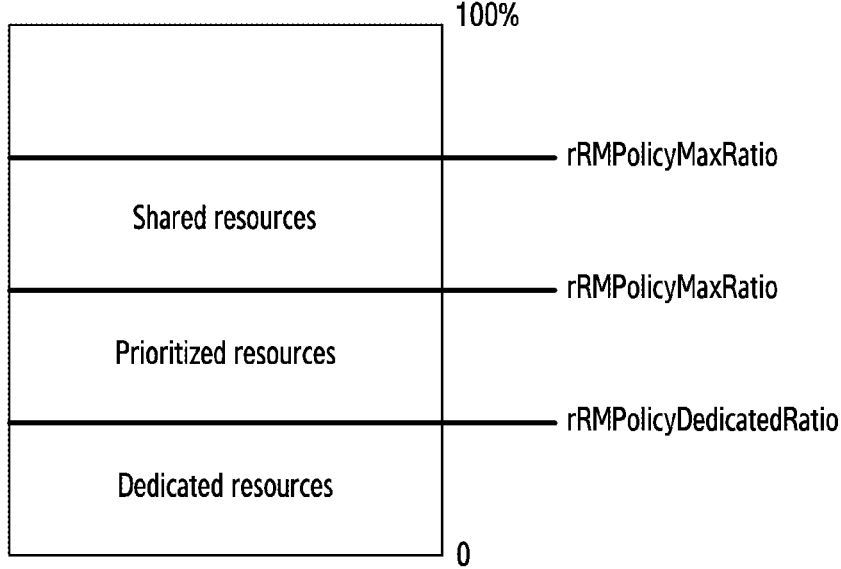
FIG. 16 is a diagram illustrating terms of shared resources, prioritized resources, and dedicated resources according to various embodiments.

FIG. 16 is a diagram illustrating examples of resource categories for slice portion-based resource control according to various embodiments. Resource categories may include shared resources, prioritized resources, and dedicated resources. In FIG. 16, shared resources, prioritized resources, and dedicated resources refer, for example, to radio resources defined in 3GPP TS 28.541. In embodiments of the disclosure, an operation between a near-RT RIC and a DU for radio resource sharing is defined by applying the concept of radio resource sharing defined in TS 28.541. The resource category for a slice portion, divided by the slice portion ID between multiple slices, may be divided into the dedicated resources, the prioritized resources, and the shared resource.

Hereinafter, definitions for each resource category are described.

Shared resources: This may refer, for example, to resources shared with other rRMPolicyMemberList(s) (e.g., rRMPolicyMemberList(s) defined in the name of RRRMPolicyRatio(s) included in the same ManagedEntity). The use of shared resources in the connected rRMpolicyMemberList is not guaranteed. The shared resource quota is represented by [rRMPolicyMaxRatio-rRMPolicyMinRatio].

Prioritized resources: This may refer, for example, to resources that are used with priority in the associated RRMPolicyMemberList. These resources are guaranteed to be used by the associated RRMPolicyMemberList when needed. When not in use, these resources may be used in other rRMPolicyMemberList(s) (e.g., rRMPolicyMemberList(s) defined in the name of RRMPolicyRatio(s) contained in the same ManagedEntity). The prioritized resource quota is represented by [rRMPolicyMinRatio-rRMPolicyDedicatedRatio].

Dedicated resources: This may refer, for example, to the resource being dedicated for use in the associated RRMPolicyMemberList. These resources are not shared even when not in use by the associated RRMPolicyMember. The dedicated resource quota is represented by by [rRMPolicyDedicatedRatio].

For example, the near-RT RIC may control the dedicated resources when control is required in a minimum unit for resource dividing between slice portions. For another example, the near-RT RIC may control dedicated resources and prioritized resources for resources that are relatively larger than other slice portions. For another example, the near-RT RIC may control the dedicated resources, the prioritized resources, and the shared resources which is common resources, to control the maximum possible resources.

Figure 17:
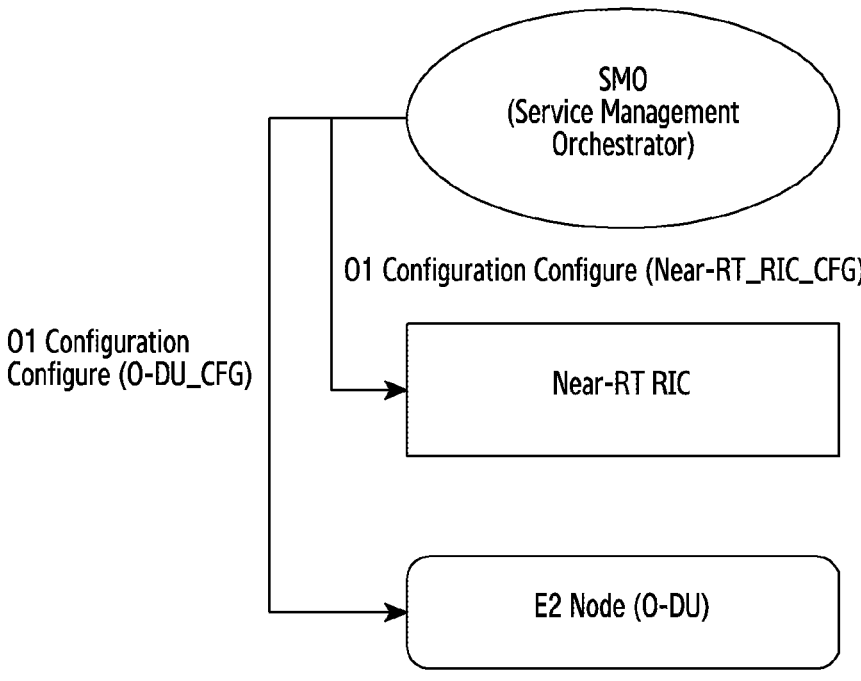
FIG. 17 is a diagram illustrating an example of O1 configuration of a service management orchestrator (SMO) according to various embodiments.

FIG. 17 is a diagram illustrating an example of O1 configuration of a service management orchestrator (SMO) according to various embodiments. FIG. 17 illustrates the initial value settings of a near-RT RIC and an O-DU when configuring an O-RAN network (e.g., when first powered on).

Referring to FIG. 17, the SMO may configure the near-RT RIC and the E2 node during system setup. The SMO may provide O1 configuration to the near-RT RIC. The O1 configuration may include initial value settings for the near-RT RIC. The SMO may provide O1 configuration to the E2 node through the O1 interface. The O1 configuration may include initial value settings for the E2 node. The E2 node may include a DU. Initial values of the near-RT RIC and the O-DU, and OAM configuration information may be configured using an O1 configuration message of O1 management I/F defined in the O-RAN standard.

Figure 18:
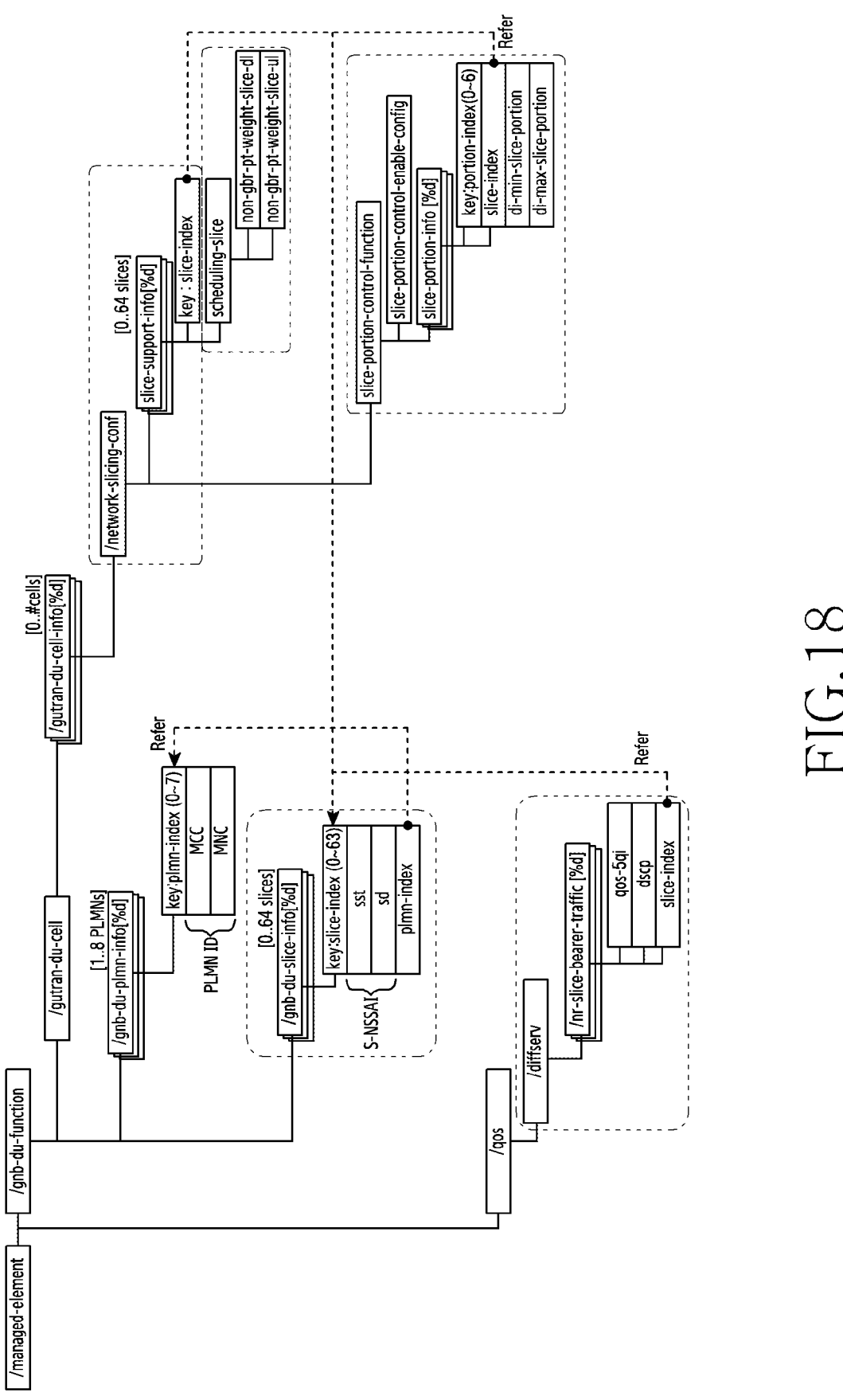
FIG. 18 is a diagram illustrating an example of slice configuration in O1 configuration according to various embodiments.

FIG. 18 is a diagram illustrating an example of slice configuration in O1 configuration according to various embodiments. In FIG. 18, the structure of slice and slice portion information among the initial value of the O-DU and the OAM configuration information described in FIG. 17 is illustrated by way of non-limiting example. In the initial value of the O1 O-DU and the OAM configuration information, mapping information between hierarchical gNB, PLMN, cell, slice, and slice portion is described. The described method may be defined differently for O-RAN/3GPP technology method.

Figure 19:
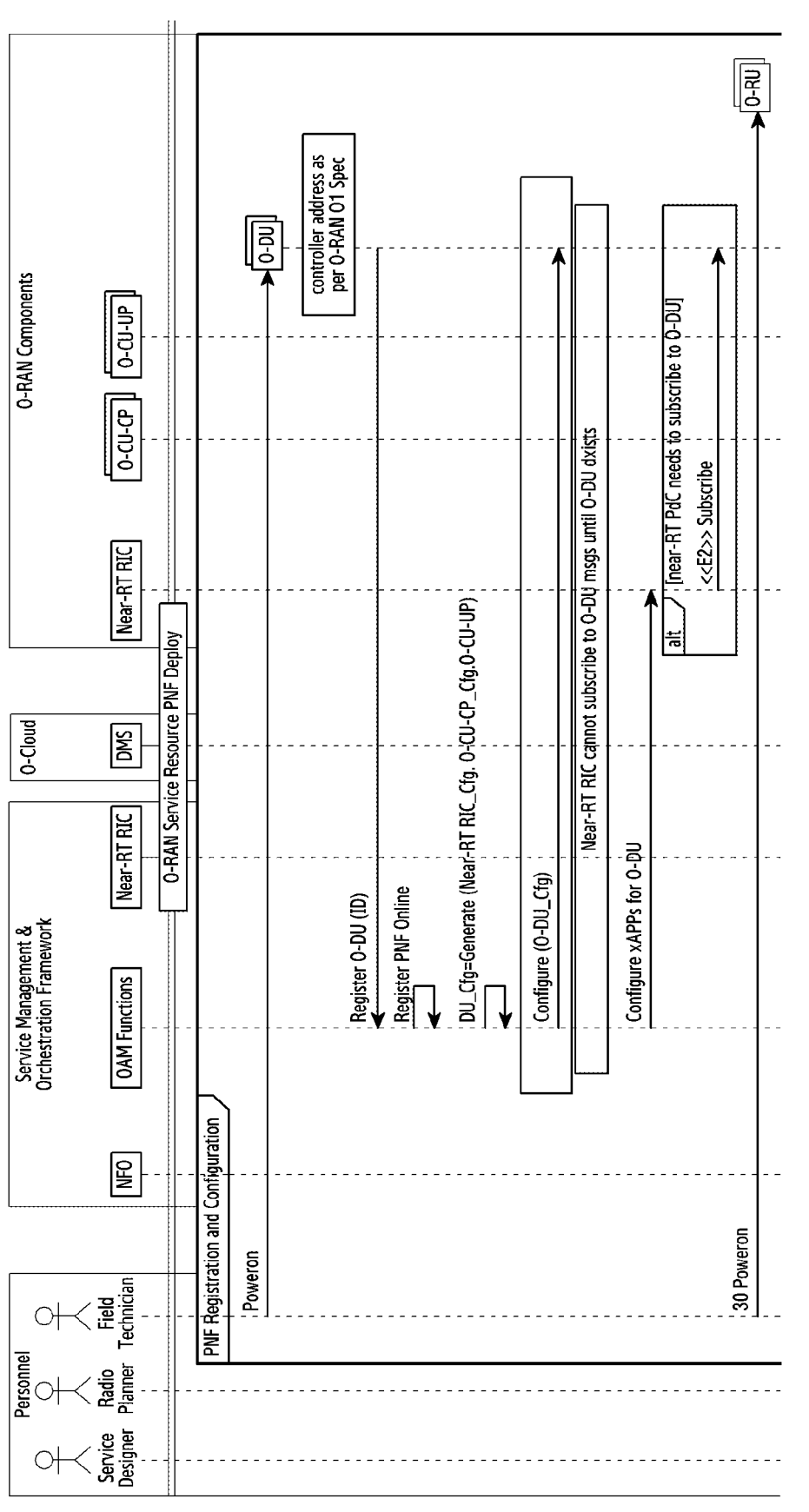
FIG. 19 is a diagram illustrating an example of an O1 configuration procedure according to various embodiments.

FIG. 19 is a diagram illustrating an example of an O1 configuration procedure according to various embodiments. FIG. 19 illustrates a call flow of O1 DU configuration defined in the O-RAN O1 architecture standard.

Referring to FIG. 19, a user personnel may turn on the power of an O-DU. The O-DU may perform registration procedures with the SMO, and an element management system (EMS) function inside the SMO may deliver mapping information between slices/PLMNs/slice portions to the O-DU as an O1 I/F message defined in the O-RAN. Here, the mapping information may indicate a slice portion defined in FIG. 15, a PLMN, and a relationship between slices. According to an embodiment, the mapping information may include at least one S-NSSAI or at least one PLMN ID for each portion index. On the other hand, in order to effectively control radio resource sharing according to slice portions, it is required that the near-RT RIC also know the mapping information.

Figure 20:
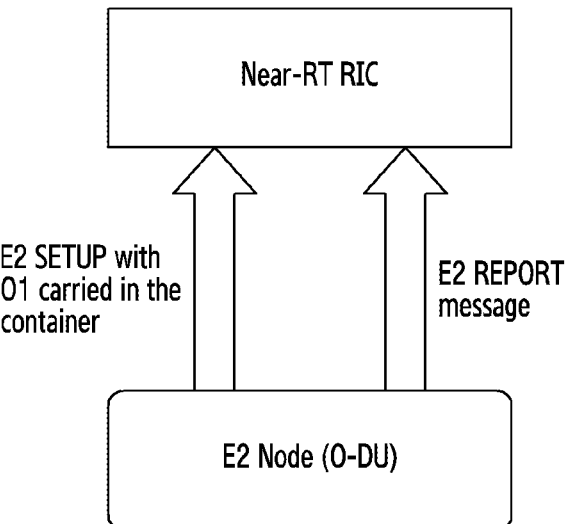
FIG. 20 is a diagram illustrating signaling for delivery of O1 configuration to a near-RT RIC according to various embodiments.

FIG. 20 is a diagram illustrating example signaling for delivery of O1 configuration to a near-RT RIC according to various embodiments. In FIG. 20, two methods for delivering mapping information between slice/PLMN/slice portion configured in the O-DU, mentioned in FIG. 19, to the near-RT RIC are illustrated.

Referring to FIG. 20, according to an embodiment, the O-DU may transmit an E2 setup request message including mapping information to the near-RT RIC. The O-DU may include O1 configuration information along with other I/F information (F1, NG, X2, XN, etc.) in the E2 setup request message defined in the O-RAN standard. The O1 configuration information may include mapping information.

For example, the E2 setup request message may be configured as follows.

TABLE 6

| IE/Group Name | Presence | Range | IE type and reference | Semantics description | Criticality | Assigned Criticality |
|---|---|---|---|---|---|---|
| Message Type | M | | 9.2.3 | | YES | reject |
| Transaction ID | M | | 9.2.33 | . | YES | reject |
| Global E2 Node ID | M | | 9.2.6 | | YES | reject |
| RAN Functions Added List | | 1 | | List of RAN functions in E2 node | YES | reject |
| >RAN Function item | | 1 . . . <maxofRANfunctionID> | | | | |
| >>RAN Function ID | M | | 9.2.8 | Id of the declared Function | — | |
| >>RAN Function Definition | M | | 9.2.23 | Definition of Function | — | |
| >>RAN Function Revision | M | | 9.2.24 | Revision counter | — | |
| >>RAN Function OID | M | | 9.2.31 | Object identifier of corresponding E2SM | — | |
| E2 Component Configuration Addition List | | 1 | | List of E2 Node component configuration information | YES | reject |
| >E2 Node Component Configuration Addition Item | | 1 . . . <maxofE2nodeComponents> | | | EACH | reject |
| >>E2 Node Component Interface Type | M | | 9.2.26 | E2 Node component interface type | — | |
| >>E2 Node Component ID | O | | 9.2.32 | E2 Node Component Identifier | — | |
| >>E2 Node Component Configuration | M | | 9.2.27 | Contents depends on component interface type | — | |

In Table 6, the interface (E2 Node Component Interface Type) type of the E2 node may be configured as follows.

TABLE 7

| IE/Group Name | Presence | Range | IE type and reference | Semantics description |
|---|---|---|---|---|
| E2 node component interface type | M | | ENUMERATED (ng, xn, e1, f1, w1, s1, x2, O1 . . .) | |

In order to include configuration information, the interface may indicate the O1 interface.

In Table 8, E2 node configuration (E2 node component ID and E2 node component configuration) may be configured as follows.

TABLE 8

| E2 Node component | Component Addition list | | Component Update list | |
| --- | --- | --- | --- | --- |
| message content | Request part | Response part | Request part | Response part |
| gNB case | | | | |
| >NG (AMF Name) | NG SETUP REQUEST, 3GPP 38.413 [19] clause 9.2.6.1 | NG SETUP RESPONSE, 3GPP 38.413 [19] clause 9.2.6.2 | RAN CONFIGURATION UPDATE, 3GPP 38.413 [19] clause 9.2.6.4 Or AMF CONFIGURATION UPDATE, 3GPP 38.413 [19] clause 9.2.6.7 | RAN CONFIGURATION UPDATE ACKNOWLEDGE, CONFIGURATION 3GPP 38.413 [19] clause 9.2.6.5 Or AMF CONFIGURATION UPDATE ACKNOWLEDGE, 3GPP 38.413 [19] clause 9.2.68 |
| >Xn (Neighbour Global NG-RAN Node ID) | XN SETUP REQUEST, 3GPP 38.423 [20] clause 9.1.3.1 | XN SETUP RESPONSE, 3GPP 38.423 [20] clause 9.1.3.2 | NG-RAN NODE CONFIGURATION UPDATE, 3GPP 38.423 [20] clause 9.1.3.4 | NG-RAN NODE CONFIGURATION UPDATE ACKNOWLEDGE, 3GPP 38.423 [20] clause 9.1.3.5 |
| >E1 (gNB-CU-UP ID) | GNB-CU-UP E1 SETUP REQUEST, 3GPP 38.463 [21] clause 9.2.1.4 Or GNB-CU-CP E1 SETUP REQUEST, 3GPP 38.463 [21] clause 9.2.1.7 | GNB-CU-UP E1 SETUP RESPONSE, 3GPP 38.463 [21] clause 9.2.1.5 Or GNB-CU-CP E1 SETUP RESPONSE, 3GPP 38.463 [21] clause 9.2.1.8 | GNB-CU-UP CONFIGURATION UPDATE, 3GPP 38.463 [21] clause 9.2.1.10 Or GNB-CU-CP CONFIGURATION UPDATE, 3GPP 38.463 [21] clause 9.2.1.13 | GNB-CU-UP CONFIGURATION UPDATE ACKNOWLEDGE, 3GPP 38.463 [21] clause 9.2.1.11 Or GNB-CU-CP CONFIGURATION UPDATE ACKNOWLEDGE, 3GPP 38.463 [21] clause 9.2.1.14 |
| >F1 (gNB-DU ID) | F1 SETUP REQUEST, 3GPP 38.473 [22] clause 9.2.1.4 | F1 SETUP RESPONSE, 3GPP 38.473 [22] clause 9.2.1.5 | GNB-DU CONFIGRATION UPDATE, 3GPP 38.473 [22] clause 9.2.1.7 Or GNB-CU CONFIGURATION UPDATE, 3GPP 38.473 [22] clause 9.2.1.10 | GNB-DU CONFIGURATION UPDATE ACKNOWLEDGE, 3GPP 38.473 [22] clause 9.2.1.8 Or GNB-CU CONFIGURATION UPDATE ACKNOWLEDGE, 3GPP 38.473 [22] clause 9.2.1.11 |
| >X2 (Neighbour Global eNB ID) | EN-DC X2 SETUP REQUEST, 3GPP 36.423 [25] clause 9.1.2.31 | EN-DC X2 SETUP RESPONSE, 3GPP 36.423 [25] clause 9.1.2.32 | EN-DC CONFIGURATION UPDATE, 3GPP 36.423 [25] clause 9.1.2.34 | EN-DC CONFIGURATION UPDATE ACKNOWLEDGE, 3GPP 36.423 [25] clause 9.1.2.35 |
| >O1 | O1 DU Configuration msg | N/A | O1 DU Configuration msg | N/A |

According to an embodiment, the O-DU may transmit an E2 report message including mapping information to the near-RT RIC. Through the E2 report service, the O-DU may deliver mapping information between the O1 slice/PLMN/slice portions of the O-DU to the near-RT RIC.

For example, the E2 report service may be defined in the RAN function. The RAN function may correspond to E2 node information among RIC service styles as illustrated in Table 9 below.

TABLE 9

| RIC Style Type | Style Name | Style Description |
|---|---|---|
| 1 | Message copy | This style is used to report a copy of complete Network Interface or RRC message. |
| 2 | Call Process Outcome | This style is used to report the outcome of an ongoing call process. |
| 3 | E2 Node Information | This style is used to report E2 Node information, Serving Cell Configuration and Neighbour Relation related information. |
| 4 | UE Information | This style is used to report the UE related information like PDCP, RLC, MAC UE state variables and RRC UE State. |
| 5 | On Demand Report | This style is used to report snapshot of UE related information and Cell related information upon request from Near-RT RIC. |

The O1 configuration message may be transmitted through the RIC service style of Table 9.

TABLE 10

| IE/Group Name | Presence | Range | IE type and reference | Semantics description |
|---|---|---|---|---|
| O1 Configuration message | M | | | Refer to O1 I/F spec for O-DU configuration |

Figure 21:
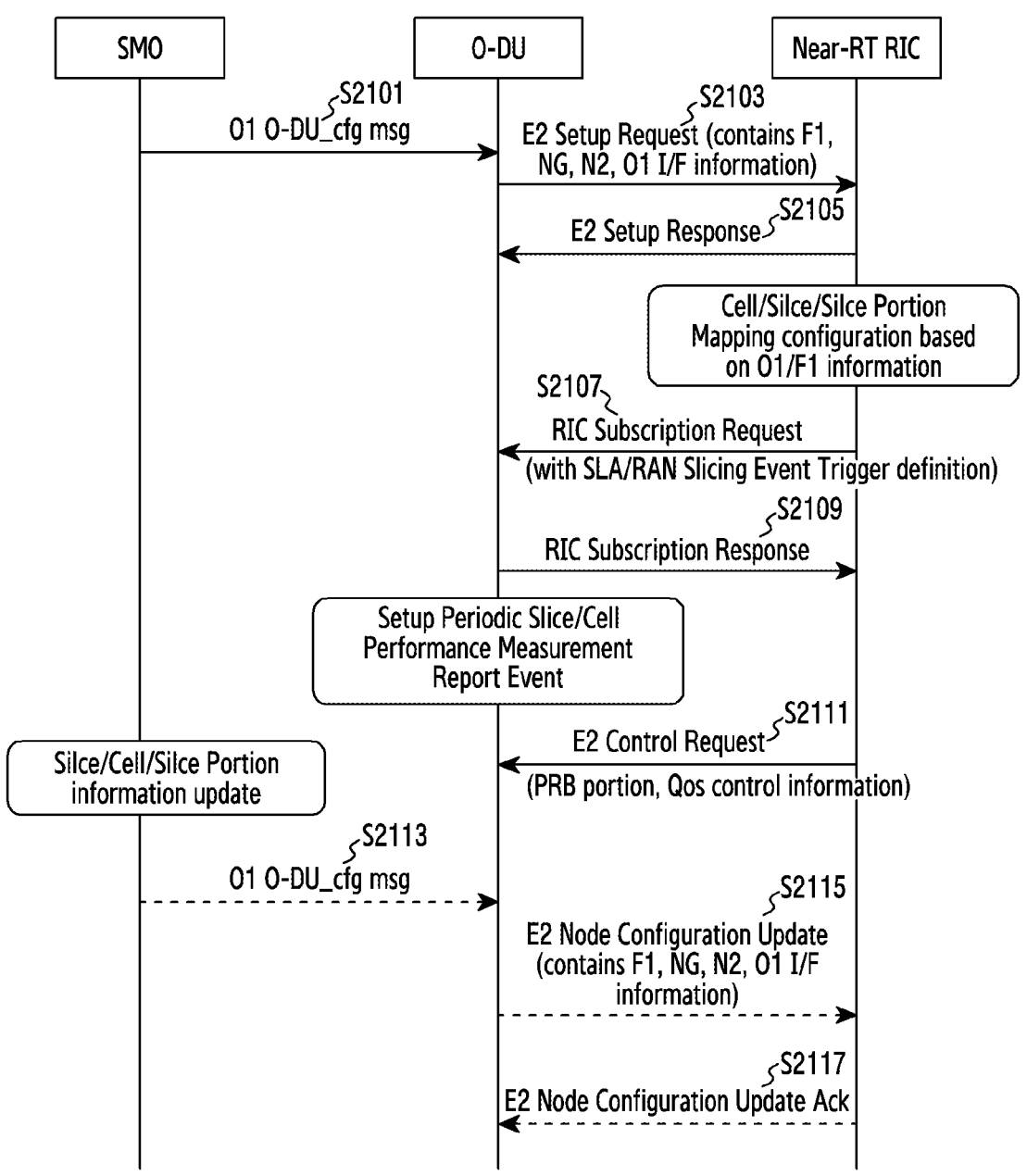
FIG. 21 is a signal flow diagram illustrating signaling for slice portion-based resource control according to various embodiments.

FIG. 21 is a signal flow diagram illustrating example signaling for slice portion-based resource sharing control according to various embodiments. FIG. 21 illustrates the entire signal flow required for control of each slice portion in the disclosure.

Referring to FIG. 21, in S2101, a SMO may transmit O1 configuration to an O-DU. The O1 configuration may include initial configuration of the O-DU. According to an embodiment, the internal EMS function of the O-SMO may configure mapping information between slice/PLMN/slice portion to the O-DU with an O1 interface message. Here, the mapping information may indicate a slice portion defined in FIG. 15, a PLMN, and a relationship between slices. According to an embodiment, the mapping information may include at least one S-NSSAI or at least one PLMN ID for each portion index. On the other hand, in order to effectively control radio resource sharing according to slice portions, the near-RT RIC is also required to know the mapping information.

In S2103, the O-DU may transmit an E2 setup request message to the near-RTRIC. In S2105, the near-RT RIC may transmit an E2 setup response message to the O-DU. The O-DU and the near-RT RIC setup E2 I/F. The E2 I/F setup request message delivers the F1 I/F of the O-DU and the setup information of the O1 I/F described above to the near-RT RIC. The near-RT RIC receiving the E2 setup message may setup the E2 I/F. The near-RT RIC may store O1 configuration information including mapping information between cells/slices/slice portions received in the E2 setup request message.

To provide the SLA/RAN slicing function, subscription procedures of S2107 and S2109 may be performed. In S2107, the near-RT RIC may transmit a RIC subscription request message to the O-DU. In S2109, the O-DU may transmit a RIC subscription response message to the near-RT RIC. According to an embodiment, the RIC subscription request message may include configuring an event for a periodic slice usage report to support RAN slicing. The O-DU may perform periodic reporting of radio resource usage information in cell/slice/slice portion based on configuration information included in the RIC subscription request.

In S2111, the near-RT RIC may transmit an E2 control request message to the O-DU. The near-RT RIC may control the PRB in the slice portion using the E2 control request message based on the PRB usage information for each slice portion of the O-DU collected in step S2109. In addition, the near-RT RIC may additionally perform QoS control for each slice based on the PRB usage information for each slice portion of the O-DU collected in step S2109.

The table below illustrates the E2 control message format 2.

TABLE 11

| IE/Group Name | Presence | IE type Range and reference | Semantics description |
|---|---|---|---|
| RIC Style Type | M | 9.3.3 | |
| Control Action ID | M | 9.3.6 | Refer to Section 7.6 |
| RIC Control decision | O | ENUMERATED (accept, reject, . . .) | Used only when a CONTROL action is sent as a response to an Insert Indication |

In the above RIC style type, RIC Style 2 used for radio resource allocation control specified in the O-RAN standard is defined.

TABLE 12

| RIC Style Type | Style Name | Style Description |
|---|---|---|
| 1 | Radio Bearer control | Used to modify the configuration the Radio Bearer Control (RBC) related parameters and/or behaviours at the E2 None for a specific UE |
| 2 | Radio resource allocation control | Used to modify the configuration the Radio Resource Allocation control related parameters and/or behaviours at the E2 Node for a specific E2 Node, cell, slice, UE, and/or QoS |

In addition, control action ID 6 or 7 may be used as the control action ID to perform various embodiments provided in the disclosure.

TABLE 13

| Control Action ID | Control Action Name | Control Action description | Associated RAN Parameters |
|---|---|---|---|
| 1 | DRX parameter configuration | To control the configuration of DRX parameters | 8.4.3.1 |
| 2 | SR periodicity configuration | To control the configuration of SR periodicity parameters | 8.4.3.2 |
| 3 | SPS parameters configuration | To control the configuration of SPS parameters | 8.4.3.3 |
| 4 | Configured grant control | To control the configuration of uplink grants to the UE | 8.4.3.4 |
| 5 | CQI table configuration | To control the configuration of CQI table. | 8.4.3.5 |
| 6 | Slice-level PRB quota | To control the radio resource management policy for slice-specific PRB quota allocation | 8.4.3.6. |
| 7 | Slice-level GBR QoS | To control GBR QoS policy for the slice | x.x.x.x |

For example, E2SM-RC control header format 2 may be used to transmit a control message.

TABLE 14

| IE/Group Name | Presence | Range | IE type and reference | Semantics description |
|---|---|---|---|---|
| RIC Style Type | M | | 9.3.3 | |
| Control Action ID | M | | 9.3.6 | Refer to Section 7.6 |
| RIC Control decision | O | | ENUMERATED (accept, reject, . . . ) | Used only when a CONTROL action is sent as a response to an Insert Indication |

For example, E2SM-RC control message format 1 may be used to transmit a control message.

TABLE 15

| IE/Group Name | Presence | Range | IE type and reference | Semantics description |
|---|---|---|---|---|
| List of RAN parameters | | 0 . . . <maxnoofAssociatedRANParameters> | | |
| >RAN Parameter ID | M | | 9.3.8 | Refer to table in Section 8.4 |
| >RAN Parameter Value Type | M | | 9.3.11 | Refer to table in Section 8.4 |

According to an embodiment, necessary parameters for slice portion control may be defined as illustrated in the table below. For slice portion control, parameters defined in 3GPP specifications (e.g., 3GPP TS 28.541) may be referred to.

The IEs defined in Table 16 may be included in the RIC control request message. Parameters may be delivered from the near-RT RIC to the E2 node through the format of Table 16.

TABLE 16

| IE/Group Name | Presence | Range | IE type and reference | Semantics description | Criticality | Assigned Criticality |
|---|---|---|---|---|---|---|
| Message Type | M | | | | YES | reject |
| CellResourceList | | 1 | | | YES | reject |
| >CellResourceItem | | 1 . . . <maxCellingNBDU(=512->36Cell/DU)> | | | — | |
| >>Cell Global ID | M | | | | YES | reject |
| >>>slice-portion-info-list | M | 1 | | | YES | reject |
| >>>>slice-portion-index | M | 1 . . . maxSlicePortions | | | | |

TABLE 16-continued

| IE/Group Name | Presence | Range | IE type and reference | Semantics description | Criticality | Assigned Criticality |
|---|---|---|---|---|---|---|
| >>>>MaxPRBPolicyRatio_DL | O | | INTEGER(0 . . . 100, . . . ) | (=rRMPolicyMaxRatio (DL) in TS 28.541) | — | |
| >>>>MinPRBPolicyRatio_DL | O | | INTEGER(0 . . . 100, . . . ) | (=rRMPolicyMinRatio (DL) in TS 28.541) | — | |
| >>>>DedicatedPRBPolicyRatio_DL | O | | INTEGER(0 . . . 100, . . . ) | (=rRMPolicyDedicatedRatio (DL) in TS 28.541) | — | |
| >>>>MaxPRBPolicyRatio_UL | O | | INTEGER(0 . . . 100, . . . ) | (=rRMPolicyMaxRatio (UL) in TS 28.541) | — | |
| >>>>MinPRBPolicyRatio_UL | O | | INTEGER(0 . . . 100, . . . ) | (=rRMPolicyMinRatio (UL) in TS 28.541) | — | |
| >>>>DedicatedPRBPolicyRatio_UL | O | | INTEGER(0 . . . 100, . . . ) | (=rRMPolicyDedicatedRatio (UL) in TS 28.541) | — | |

According to an embodiment, at least one necessary parameter for controlling the slice portion may be delivered in a manner according to the E2SM service. Referring to the RAN parameter ID and RAN parameter value type of the E2SM-RC control message format 1 of Table 15, at least one of the above-described parameters may be delivered from the near-RT RIC to the E2 node. In this case, the RAN parameter ID and RAN parameter value type for each parameter may be defined as illustrated in Table 16-1 below.

used. In the example of FIG. 15, the maximum ratio may be a ratio including dedicated resources and prioritized resources.

According to an embodiment, dedicatedPRBPolicyRatio_DL may refer to a fixed size of downlink PRBs that that may be included in a corresponding slice portion. For example, rRMPolicydedicatedRatio of 3GPP TS 28.541 may be used. In the example of FIG. 15, the maximum ratio may be a ratio including dedicated resources only.

TABLE 16-1

| RAN Parameter ID | RAN Parameter | RAN Parameter Value Type | Key Flag | RAN Parameter Definition | Semantics Description |
|---|---|---|---|---|---|
| 1 | CellResourceList | LIST | | 0 . . . <maxnoofRRMPolicyRatioGroups> | RRMPolicyRatioList in TS 28.541 |
| 2 | >CellResourceItem | STRUCTURE | | | RRMPolicyRatio in TS 28.541 |
| 3 | >> NR Cell | STRUCTURE | FALSE | | |
| 4 | >>>NR CGI | ELEMENT | TRUE | NR CGI IE in TS 38.423 [15] Section 9.2.2.7 | |
| 5 | >>>>slice-portion-info-list | LIST | | | |
| 6 | >>>>>slice-portion-index | STRUCTURE | | | |
| 7 | >>>>>MaxPRBPolicyRatio_DL | ELEMENT | FALSE | INTEGER (0 . . . 100) | rRMPolicyMinRatio IE in TS 28.541 |
| 8 | >>>>>MinPRBPolicyRatio_DL | ELEMENT | FALSE | INTEGER (0 . . . 100) | rRMPolicyMaxRatio IE in TS 28.541 |
| 9 | >>>>>DedicatedPRBPolicyRatio_DL | ELEMENT | FALSE | INTEGER (0 . . . 100) | rRMPolicyDedicatedRatio IE in TS 28.541 |
| 10 | >>>>>MaxPRBPolicyRatio_UL | ELEMENT | FALSE | INTEGER (0 . . . 100) | rRMPolicyMinRatio IE in TS 28.541 |
| 11 | >>>>>MinPRBPolicyRatio_UL | ELEMENT | FALSE | INTEGER (0 . . . 100) | rRMPolicyMaxRatio IE in TS 28.541 |
| 12 | >>>>>DedicatedPRBPolicyRatio_UL | ELEMENT | FALSE | INTEGER (0 . . . 100) | IRMPolicyDedicatedRatio IE in TS 28.541 |

In the above table, cell global ID indicates a specific cell to be controlled. Resources of the specific cells are managed and controlled by slice portion. Each slice portion (oration) may be designated as a slice portion index.

According to an embodiment, MaxPRBPolicyRatio_DL may refer to the maximum ratio of downlink PRBs that that may be included in a corresponding slice portion. For example, rRMPolicyMaxRatio of 3GPP TS 28.541 may be used. In the example of FIG. 15, the maximum ratio may be a ratio including dedicated resources, prioritized resources, and shared resources.

According to an embodiment, MinPRBPolicyRatio_DL may refer to the minimum ratio of downlink PRBs that that may be included in a corresponding slice portion. For example, rRMPolicyMinRatio of 3GPP TS 28.541 may be According to an embodiment, MaxPRBPolicyRatio_UL may refer to the maximum ratio of uplink PRBs that that may be included in a corresponding slice portion. For example, rRMPolicyMaxRatio of 3GPP TS 28.541 may be used. In the example of FIG. 15, the maximum ratio may be a ratio including dedicated resources, prioritized resources, and shared resources.

According to an embodiment, MinPRBPolicyRatio_UL may refer to the minimum ratio of uplink PRBs that that may be included in a corresponding slice portion. For example, rRMPolicyMinRatio of 3GPP TS 28.541 may be used. In the example of FIG. 15, the maximum ratio may be a ratio including dedicated resources and prioritized resources.

According to an embodiment, dedicatedPRBPolicyRatio_UL may refer to a fixed size of uplink PRBs that that may be included in a corresponding slice portion. For example, rRMPolicydedicatedRatio of 3GPP TS 28.541 may be used. In the example of FIG. 15, the maximum ratio may be a ratio including dedicated resources only.

In each parameter, the ratio may refer to a ratio occupied by the corresponding resource based on all allocatable resources (e.g., the number of PRBs that can be allocated from the transmission bandwidth of the cell). According to the resource management definition of 3GPP TS 28.541, the resources of the slice portion to be controlled may divide dedicated, min, and max resources into UL/DL, and the near-RT RIC may control each parameter with an integer value between 1 and 100. Through this, among resources in all cells, resources shared between slices, that is, resources corresponding to slice portions may be managed.

In the following, when the O1 configuration is updated, the repeated procedure is described.

In S2113, the SMO may transmit an E2 Control Request message to the O-DU again as in S2101. For example, mapping information between above-mentioned cell, slice portion, PLMN, and slice may also be updated. The SMO may be required to update the O1 configuration. Accordingly, the SMO may transmit the updated O1 configuration to the O-DU.

According to an embodiment, the method may include a process of configuring maximum/minimum portion value of uplink/downlink PRB, uplink/downlink PF weight adjustment, and GBR scheduling priority. In addition, the control message may include control configuration for UL/DL GBR priority per DRB ID for each specific UE supporting the corresponding S-NSSAI.

According to an embodiment, the near-RT RIC may be configured to generate a control message including control information for controlling PRB and QoS allocation for each network slice or each UE, and transmit the control message to the distributed unit (DU). The control information may be used to adjust PRB and QoS resources allocable in the network slice of the DU.

In the disclosure, necessary parameters for QoS control of a specific slice are defined as illustrated in the table below. For QoS control of a specific slice, the parameters in Table 17 may be referred to. The IEs defined in Table 17 may be included in the RIC control request message. Parameters may be delivered from the near-RT RIC to the E2 node through the format of Table 17.

TABLE 17

| IE/Group Name | Presence | Range | IE type and reference | Semantics description | Criticality | Assigned Criticality |
|---|---|---|---|---|---|---|
| Message Type | M | | | | YES | reject |
| CellResourceList | | 1 | | | YES | reject |
| >CellResourceItem | | 1 . . . <MAX_CELL_PER_DU> | | | — | |
| >>Cell Global ID | M | | | NR CGI A cell that is serving the UE, either PCell or SCell | YES | reject |
| >>>GBR-scheduling-slice-list | | | | | | |
| >>>>GBR-scheduling-slice-list-item | | <1 . . . maxSliceinCell->64> | | For FT, max 5qi = 8 and max slice = 8 is assume (in SS commercial system, max5QI = 20 and max slice = 64 configurable) | | |
| >>>>>slice-index | M | | | slice-index = (SST, SD, plmn-index) mapping in DU YANG | | |
| >>>>>5qi | M | | | | | |
| >>>>>Uplink GBR scheduling priority | O | | INTEGER (0.255) | | | |
| >>>>>Downlink GBR scheduling priority | O | | INTEGER (0.255) | | | |

In S2115, the O-DU may transmit an E2 node configuration update message to the near-RT RIC. The E2 node configuration update message may include updated O1 configuration. In S2117, the near-RT RIC may transmit an E2 node configuration update acknowledge message to the O-DU. Although not illustrated in FIG. 21, the near-RT RIC may perform resource control for the slice portion based on the updated O1 configuration.

According to an embodiment, at least one necessary parameter for controlling the slice portion may be delivered in a manner according to the E2SM service. Referring to the RAN parameter ID and RAN parameter value type of the E2SM-RC control message format 1 of Table 15, at least one of the above-described parameters may be delivered from the near-RT RIC to the E2 node. In this case, the RAN parameter ID and RAN parameter value type for each parameter may be defined as illustrated in Table 17-1 below.

TABLE 17-1

| RAN Parameter ID | RAN Parameter | RAN Parameter Value Type | Key Flag | RAN Parameter Definition | Semantics Description |
|---|---|---|---|---|---|
| 1 | List of Cell | List | | | |
| 2 | > NR Cell | STRUCTURE | FALSE | | |
| 3 | >> NR CGI | ELEMENT | TRUE | NR CGI IE in TS 38.423 [15] Section 9.2.2.7 | |
| 4 | GBR-Scheduling-Slice-list | List | | | |
| 5 | > GBR-Scheduling-list-Item | STRUCTURE | | | |
| 6 | >>Slice-Index | ELEMENT | | | PLMN ID, S-NSSAI mapping information received from O-DU |
| 7 | >>5QI | ELEMENT | FALSE | 5QI IE in TS 38.463 [21] Section 9.3.1.27 or TS 38.463 [21] Section 9.3.1.28 | |
| 8 | >>Uplink GBR Scheduling Priority | ELEMENT | FALSE | INTEGER (0.255) | Scheduling priority of GBR bearers among bearers in uplink |
| 9 | >>Downlink GBR Scheduling Priority | ELEMENT | FALSE | INTEGER (0.255) | Scheduling priority of GBR bearers among bearers in downlink |

In the above table, the cell global ID represents a specific cell to be controlled. The resources of specific cells may be QoS controlled by slice. The 5QI value and the UL/DL GBR scheduling priority are controlled using an integer value of 0 to 255 defined in the 3GPP TS 23.501 specification.

The 5QI is a scalar value used as a reference for 5G QoS characteristics. In other words, the 5QI refers to a parameter for each access node that controls the QoS delivery process-ing for QoS flows (e.g., scheduling weights, admission thresholds, queue management thresholds, link layer proto-col configuration, etc.).

In Table 17 and Table 17-1, downlink GBR scheduling priority (e.g., DL GBR scheduling priority) and uplink GBR scheduling priority (e.g., UL GBR scheduling priority) are separately configured. On the other hand, according to an embodiment, the GBR scheduling priority may be displayed in one IE.

TABLE 18

| IE/Group Name | Presence | Range | IE type and reference | Semantics description | Criticality | Assigned Criticality |
|---|---|---|---|---|---|---|
| Message Type | M | | | | YES | reject |
| CellResourceList | | 1 | | | YES | reject |
| >CellResourceItem | | 1 . . . <MAX_CELL_PER_DU> | | | — | |
| >>Cell Global ID | M | | | NR CGI A cell that is serving the UE, either PCell or SCell | YES | reject |
| >>>GBR-scheduling-slice-list | | | | | | |
| >>>>GBR-scheduling-slice-list-item | | <1 . . . maxSliceinCell-->64> | | | | |
| >>>>>slice-index | M | | | slice-index = (SST, SD, plmn-index) mapping in DU YANG | | |
| >>>>>5qi-scheduling-slice-list-item | | <1 . . . max5qi--255> | | | | |
| >>>>>>5qi | M | | | | | |
| >>>>>>GBR scheduling priority | M | | INTEGER (0.255) | Priority Level is specified in TS 23.501 5.7.3.3. | | |

TABLE 19

| RAN Parameter ID | RAN Parameter | RAN Parameter Value Type | Key Flag | RAN Parameter Definition | Semantics Description |
|---|---|---|---|---|---|
| 1 | List of Cell | List | | | |
| 2 | > NR Cell | STRUCTURE | FALSE | | |
| 3 | >> NR CGI | ELEMENT | TRUE | NR CGI IE in TS 38.423 [15] Section 9.2.2.7 | |
| 4 | GBR-Scheduling-Slice-list | List | | | |
| 5 | > GBR-Scheduling-list-item | STRUCTURE | | | |
| 6 | >>Slice-Index | ELEMENT | TRUE | | PLMN ID, S-NSSAI mapping information received from O-DU |
| 7 | >>5QI | ELEMENT | TRUE | 5QI IE in TS 38.463 [21] Section 9.3.1.27 or TS 38.463 [21] Section 9.3.1.28 | |
| 8 | >>GBR Scheduling Priority | ELEMENT | FALSE | INTEGER (0.255) | Scheduling priority of GBR bearers among bearers in uplink |

In the disclosure, the GBR scheduling priority refers to a priority level related to the 5G QoS characteristics. The priority level indicates the priority of scheduling resources among QoS flows. The lowest priority value may correspond to the highest priority. Priority levels should be used to distinguish QoS flows of the same UE, and may also be used to distinguish QoS flows of different UEs.

In case of congestion, when all QoS requirements may not be met for one or more QoS flows, the priority level may be used to select QoS flows that prioritize QoS requirements so that QoS flows with a priority level value of N are prioritized. The QoS flows with higher priority level values (e.g., N+1, N+2, etc.). In the absence of congestion, resource distribution among QoS flows may be defined using priority levels. In addition, the scheduler may prioritize QoS flows based on different parameters (e.g., resource type, radio conditions) to optimize application performance and network capacity.

Every standardized 5QI may be associated with a default value of a designated priority level defined in the QoS specific table (Table 5.7.4.1 of 3GPP TS 23.501). The priority level may be signaled to the RAN together with the standardized 5QI, and may be used instead of the default value when received. The priority level may also be signaled to (R)AN together with a pre-configured 5QI, and may be used instead of a preset value when received.

As described above, based on Table 17, Table 17-1, Table 18, and Table 19, the near-RT RIC may perform slice-by-slice QoS control for the E2 node. According to an embodiment, the near-RT RIC may transmit an E2 control request message. The PDU session corresponds to one network slice per PLMN. The QoS flows corresponding to one PDU session are mapped with one or more DRBs. That is, the DRB is associated with one network slice. To control the DRB, the near-RT RIC may include the slice ID in a control message (e.g., E2 control request). The near-RT RIC may include QoS information for each slice ID in the control message. Here, the QoS information may include a QoS identifier such as 5QI and a priority level (e.g., a value of 0 to 255). The control message may include a slice ID.

According to various example embodiments of the disclosure, a method performed by a distributed unit (DU) may include: transmitting a message including an O1 interface configuration to a near-real time (RT) radio access network (RAN) intelligent controller (RIC) through an E2 interface, wherein the O1 interface configuration may include mapping information between cells, slice portions, and network slices; receiving a control message for resource control for each slice portion from the near-real time (RT) RIC, wherein the control message may include network slice information and at least one parameter for resource control of the slice portion; and performing resource allocation for one or more slices corresponding to the slice portion.

According to an embodiment, the at least one parameter includes at least one of a ratio of dedicated resources for the slice portion, a ratio of shared resources for the slice portion, or a ratio of additional resources for the slice portion.

According to an embodiment, the mapping information may represent a relationship between a public land mobile network (PLMN) and single network slice selection assistance information (S-NSSAI).

According to an embodiment, the method may further include: performing a service subscription procedure to guarantee a service level agreement (SLA) with the near-RT RIC; and reporting information on resource usage to the near-RT RIC, wherein the control message may be generated based on the service subscription procedure, the information on resource usage, and the mapping information.

According to an embodiment, the message may be transmitted to the near-RT RIC through an E2 setup request message of an E2 setup procedure or a report service of an E2 SM.

According to various example embodiments of the disclosure, a method performed by a near-real time (RT)-radio access network (RAN) intelligent controller (RIC) may include: transmitting a message including an O1 interface configuration to the distributed unit (DU) through an E2 interface, wherein the O1 interface configuration may include mapping information between cells, slice portions, and network slices; generating a control message for resource control for each slice portion, wherein the control message may include network slice information and at least one parameter for resource control of the slice portion; and transmitting the control message to the DU.

According to an embodiment the at least one parameter includes at least one of a ratio of dedicated resources for the slice portion, a ratio of shared resources for the slice portion, or a ratio of additional resources for the slice portion.

According to an embodiment, the mapping information may represent a relationship between a public land mobile network (PLMN) and single network slice selection assistance information (S-NSSAI).

According to an embodiment, the method may further include: performing a service subscription procedure to guarantee a service level agreement (SLA) with the DU; and reporting information on resource usage from the DU, wherein the control message may be generated based on the service subscription procedure, the information on resource usage, and the mapping information.

According to an embodiment, the message may be received from the DU through an E2 setup request message of an E2 setup procedure or a report service of an E2 SM According to various example embodiments of the disclosure, a device of a distributed unit (DU) may include: at least one transceiver, and at least one processor, wherein the at least one processor is configured to: transmit a message including an O1 interface configuration to a near-real time (RT) radio access network (RAN) intelligent controller (RIC) through an E2 interface, the O1 interface configuration including mapping information between cells, slice portions, and network slices; receive a control message for resource control for each slice portion from the near-real time (RT) RIC, the control message including network slice information and at least one parameter for resource control of the slice portion; and perform resource allocation for one or more slices corresponding to the slice portion.

According to an embodiment, the at least one parameter may include at least one of a ratio of dedicated resources for the slice portion, a ratio of shared resources for the slice portion, or a ratio of additional resources for the slice portion.

According to an embodiment, the mapping information may represent a relationship between a public land mobile network (PLMN) and single network slice selection assistance information (S-NSSAI).

According to an embodiment, the at least one processor may be further configured to: perform a service subscription procedure for guaranteeing a service level agreement (SLA) with the near-RT RIC; and report information on resource usage to the near-RT RIC, wherein the control message may be generated based on the service subscription procedure, the information on resource usage, and the mapping information.

According to an embodiment, the message may be transmitted to the near-RT RIC through an E2 setup request message of an E2 setup procedure or a report service of an E2 SM.

According to various example embodiments of the disclosure, a device of a near-real time (RT)-radio access network (RAN) intelligent controller (RIC) may include: at least one transceiver, and at least one processor, wherein at least one processor may be configured to: transmit, through the at least one transceiver, a message including an O1 interface configuration to the distributed unit (DU) through an E2 interface, wherein the O1 interface configuration may include mapping information between cells, slice portions, and network slices; generate a control message for resource control for each slice portion, wherein the control message may include network slice information and at least one parameter for resource control of the slice portion; and transmit the control message to the DU through the at least one transceiver.

According to an embodiment, the at least one parameter may include at least one of a ratio of dedicated resources for the slice portion, a ratio of shared resources for the slice portion, or a ratio of additional resources for the slice portion.

According to an embodiment, the mapping information may represent a relationship between a public land mobile network (PLMN) and single network slice selection assistance information (S-NSSAI).

According to an embodiment, the at least one processor may be further configured to: perform a service subscription procedure for guaranteeing a service level agreement (SLA) with the DU; and report information on resource usage from the DU through the at least one transceiver, wherein the control message may be generated based on the service subscription procedure, the information on resource usage, and the mapping information.

According to an embodiment, the message may be transmitted to the near-RT RIC through an E2 setup request message of an E2 setup procedure or a report service of an E2 SM.

Methods based on the claims or the embodiments disclosed in the disclosure may be implemented in hardware, software, or a combination of both.

When implemented in software, a computer readable storage medium for storing one or more programs (software modules) may be provided. The one or more programs stored in the computer readable storage medium are configured for execution performed by one or more processors in an electronic device. The one or more programs include instructions for allowing the electronic device to execute the methods based on the claims or the embodiments disclosed in the disclosure.

The program (the software module or software) may be stored in a random access memory, a non-volatile memory including a flash memory, a read only memory (ROM), an electrically erasable programmable read only memory (EE-PROM), a magnetic disc storage device, a compact disc-ROM (CD-ROM), digital versatile discs (DVDs) or other forms of optical storage devices, and a magnetic cassette. The program may be stored in a memory configured in combination of all or some of these storage media. In addition, the configured memory may be plural in number.

Further, the program may be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device may access via an external port to a device which performs the embodiments of the disclosure. In addition, an additional storage device on a communication network may access to a device which performs the embodiments of the disclosure.

In the above-described example embodiments of the disclosure, elements included in the disclosure are expressed in singular or plural forms according to specific embodiments. However, singular or plural forms are appropriately selected according to suggested situations for convenience of explanation, and the disclosure is not limited to a single element or plural elements. An element which is expressed in a plural form may be configured in a singular form or an element which is expressed in a singular form may be configured in plural number.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method performed by a distributed unit (DU), the method comprising:

transmitting, to a near-real time (near-RT) radio access network (RAN) intelligent controller (RIC), an E2 report message including resource policy information related to a shared resource, a prioritized resource, and a dedicated resource of a radio resource for a radio resource management (RRM) policy member list (rRMPolicyMemberList);

receiving, from the RT RIC, an E2 control message generated based on the resource policy information; and performing a resource allocation based on the E2 control message, wherein the resource policy information includes an RRM policy maximum ratio (rRMPolicyMaxRatio), an RRM policy minimum ratio (rRMPolicyMinRatio) and an RRM policy dedicated ratio (rRMPolicyDedicatedRatio), wherein each of the rRMPolicyMaxRatio, the rRMPolicyMinRatio and the rRMPolicyDedicatedRatio are indicated with an integer between 0 and 100, wherein the shared resource is determined based on a difference between the rRMPolicyMaxRatio and the rRMPolicyMinRatio, wherein the prioritized resource is determined based on a difference between the rRMPolicyMinRatio and the rRMPolicyDedicatedRatio, and wherein the dedicated resource is determined based on the rRMPolicyDedicatedRatio.

2. The method of claim 1, wherein the rRMPolicyMemberList are subject to the resource policy information;

wherein the rRMPolicyMaxRatio indicates a maximum percentage of radio resources that can be used by the rRMPolicyMemberList;

wherein the rRMPolicyMinRatio indicates a minimum percentage of the radio resources that can be used by the rRMPolicyMemberList; and wherein the rRMPolicyDedicatedRatio indicates a percentage of radio resources that can be dedicatedly used by the rRMPolicyMemberList.

3. The method of claim 1, wherein the E2 control message includes at least one of the rRMPolicyMaxRatio, the rRMPolicyMinRatio and the rRMPolicyDedicatedRatio.

4. The method of claim 1, further comprising, transmitting, to the near-RT RIC, information related to O1 interface configuration.

5. A method performed by a near-real time (near-RT) radio access network (RAN) intelligent controller (RIC), the method comprising:

receiving, from a distributed unit (DU), an E2 report message including resource policy information related to a shared resource, a prioritized resource, and a dedicated resource of a radio resource for a radio resource management (RRM) policy member list (RMPolicyMemberList); and transmitting, to the DU, an E2 control message generated based on the resource policy information, wherein the resource policy information includes an RRM policy maximum ratio (RMPolicyMaxRatio), an RRM policy minimum ratio (rRMPolicyMinRatio) and an RRM policy dedicated ratio (rRMPolicyDedicatedRatio), wherein each of the rRMPolicyMaxRatio, the rRMPolicyMinRatio and the rRMPolicyDedicatedRatio are indicated with an integer between 0 and 100, wherein the shared resource is determined based on a difference between the rRMPolicyMaxRatio and the rRMPolicyMinRatio, wherein the prioritized resource is determined based on a difference between the rRMPolicyMinRatio and the rRMPolicy DedicatedRatio, and wherein the dedicated resource is determined based on the rRMPolicyDedicatedRatio.

6. The method of claim 5, wherein the rRMPolicyMemberList are subject to the resource policy information;

wherein the rRMPolicyMaxRatio indicates a maximum percentage of radio resources that can be used by the rRMPolicyMemberList;

wherein the rRMPolicyMinRatio indicates a minimum percentage of the radio resources that can be used by the rRMPolicyMemberList; and wherein the rRMPolicyDedicatedRatio indicates a percentage of radio resources that can be dedicatedly used by the rRMPolicyMemberList.

7. The method of claim 5, wherein the E2 control message includes at least one of the rRMPolicyMaxRatio, the rRMPolicyMinRatio and the rRMPolicyDedicatedRatio.

8. The method of claim 5, further comprising, receiving, from the DU, information related to O1 interface configuration.

9. A device of a distributed unit (DU), the device comprising:

at least one transceiver comprising circuitry; and at least one processor comprising circuitry, wherein the at least one processor is individually and/or collectively configured to:

transmit, to a near-real time (near-RT) radio access network (RAN) intelligent controller (RIC), an E2 report message including resource policy information related to a shared resource, a prioritized resource, and a dedicated resource of a radio resource for a radio resource management (RRM) policy member list (rRMPolicyMemberList);

receive, from the RT RIC, an E2 control message generated based on the resource policy information; and perform a resource allocation based on the E2 control message, wherein the resource policy information includes an RRM policy maximum ratio (rRMPolicyMaxRatio), an RRM policy minimum ratio (rRMPolicyMinRatio) and an RRM policy dedicated ratio (rRMPolicyDedicatedRatio), wherein each of the rRMPolicyMaxRatio, the rRMPolicyMinRatio and the rRMPolicyDedicatedRatio are indicated with an integer between 0 and 100, wherein the shared resource is determined based on a difference between the rRMPolicyMaxRatio and the rRMPolicyMinRatio, wherein the prioritized resource is determined based on a difference between the rRMPolicyMinRatio and the rRMPolicyDedicatedRatio, and wherein the dedicated resource is determined based on the rRMPolicy DedicatedRatio.

10. The device of claim 9, wherein the rRMPolicyMemberList are subject to the resource policy information;

wherein the rRMPolicyMaxRatio indicates a maximum percentage of radio resources that can be used by the rRMPolicyMemberList;

wherein the rRMPolicyMinRatio indicates a minimum percentage of the radio resources that can be used by the rRMPolicyMemberList; and wherein the rRMPolicyDedicatedRatio indicates a percentage of radio resources that can be dedicatedly used by the rRMPolicyMemberList.

11. The device of claim 9, wherein the E2 control message includes at least one of the rRMPolicyMaxRatio, the rRMPolicyMinRatio and the rRMPolicyDedicatedRatio.

12. The device of claim 9, wherein the at least one processor is further configured to:

transmit, to the RT RIC, information related to O1 interface configuration.

13. A device of a near-real time (near-RT) radio access network (RAN) intelligent controller (RIC), the device comprising:

at least one transceiver comprising circuitry; and at least one processor comprising circuitry, wherein the at least one processor is individually and/or collectively configured to:

receive, from a distributed unit (DU), an E2 report message including resource policy information related to a shared resource, a prioritized resource, and a dedicated resource of a radio resource for a radio resource management (RRM) policy member list (rRMPolicyMemberList); and transmit, to the DU, an E2 control message generated based on the resource policy information, wherein the resource policy information includes an RRM policy maximum ratio (rRMPolicyMaxRatio), an RRM policy minimum ratio (rRMPolicyMinRatio) and an RRM policy dedicated ratio (rRMPolicyDedicatedRatio), wherein each of the rRMPolicyMaxRatio, the rRMPolicyMinRatio and the rRMPolicyDedicatedRatio are indicated with an integer between 0 and 100, wherein the shared resource is determined based on a difference between the rRMPolicyMaxRatio and the rRMPolicy MinRatio, wherein the prioritized resource is determined based on a difference between the rRMPolicyMinRatio and the rRMPolicyDedicatedRatio, and wherein the dedicated resource is determined based on the rRMPolicyDedicatedRatio.

14. The device of claim 13, wherein the rRMPolicyMemberList are subject to the resource policy information;

wherein the rRMPolicyMaxRatio indicates a maximum percentage of radio resources that can be used by the rRMPolicyMemberList;

wherein the rRMPolicyMinRatio indicates a minimum percentage of the radio resources that can be used by the rRMPolicyMemberList; and wherein the rRMPolicyDedicatedRatio indicates a percentage of radio resources that can be dedicatedly used by the rRMPolicyMemberList.

15. The device of claim 13, wherein the E2 control message includes at least one of the rRMPolicyMaxRatio, the rRMPolicyMinRatio and the rRMPolicyDedicatedRatio.

16. The device of claim 13, wherein the at least one processor is further configured to:

receive, from the DU, information related to O1 interface configuration.

* * * * *